(12) United States Patent
Liu et al.

(10) Patent No.: US 11,082,111 B2
(45) Date of Patent: Aug. 3, 2021

(54) DETERMINING A TPMI FOR A CODEBOOK SET

(71) Applicant: Lenovo (Beijing) Limited, Beijing (CN)

(72) Inventors: Bingchao Liu, Beijing (CN); Chenxi Zhu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 16/765,113

(22) PCT Filed: Nov. 16, 2017

(86) PCT No.: PCT/CN2017/111275
§ 371 (c)(1),
(2) Date: May 18, 2020

(87) PCT Pub. No.: WO2019/095181
PCT Pub. Date: May 23, 2019

(65) Prior Publication Data
US 2021/0152227 A1    May 20, 2021

(51) Int. Cl.
*H04B 7/06* (2006.01)
*H04B 7/0456* (2017.01)

(52) U.S. Cl.
CPC ......... *H04B 7/0639* (2013.01); *H04B 7/0486* (2013.01); *H04B 7/0628* (2013.01)

(58) Field of Classification Search
CPC ... H04B 7/0639; H04B 7/0486; H04B 7/0628
See application file for complete search history.

(56) References Cited

U.S. PATENT DOCUMENTS

2014/0177745 A1   6/2014  Krishnamurthy et al.
2020/0228266 A1*  7/2020  Kim .................. H04B 7/06
(Continued)

FOREIGN PATENT DOCUMENTS

CN         105978655 A      9/2016

OTHER PUBLICATIONS

International Searching Authority, PCT/CN2017/111275, "Notification of Transmittal of the International Search Report and the Written Opinion of the International Searching Authority, or the Declaration", PCT dated Jul. 31, 2018, pp. 1-9.

(Continued)

*Primary Examiner* — Jaison Joseph
(74) *Attorney, Agent, or Firm* — Kunzler Bean & Adamson

(57) ABSTRACT

Apparatuses, methods, and systems are disclosed for determining a TPMI for a codebook set. One method includes receiving information indicating a transmission capability of a remote unit. The method includes determining a transmit precoding matrix indication based on a rank and a codebook corresponding to the transmission capability and the rank, wherein the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. The method includes transmitting the transmit precoding matrix indication to the remote unit.

20 Claims, 5 Drawing Sheets

(56) References Cited

U.S. PATENT DOCUMENTS

2020/0412421 A1* 12/2020 Jiang ................... H04W 72/048
2021/0050891 A1* 2/2021 Park ..................... H04B 7/0486

OTHER PUBLICATIONS

Huawei, Hisilicon, "Codebook based transmission for UL MIMO", 3GPP TSG RAN WG1 Meeting #90bis R1-1718237, Oct. 9-13, 2017, pp. 1-10.

Ericsson, "Codebook Based UL MIMO", 3GPP TSG-RAN WG1 #90bis R1-1718425, Oct. 9-13, 2017, pp. 1-12.

Qualcomm Incorporated, "Codebook-based UL Transmission" 3GPP TSG RAN WG1 Meeting #90bis R1-1718536, 9th-13th, 2017, pp. 1-7.

NTT DOCOMO, Inc., "Codebook design for uplink", 3GPP TSG RAN WG1 Meeting #90bis R1-1718188, Oct. 9-13, 2017, pp. 1-3.

Motorola, "Control Signalling for UL MIMO", 3GPP TSG RAN WG1 Meeting #61bis R1-103930, Jun. 28-Jul. 3, 2010, pp. 1-6.

LG Electonics, "Discussion on codebook based transmission for UL", 3GPP TSG RAN WG1 Meeting #90bis R1-1717936, Oct. 9-13, 2017, pp. 1-6.

Vivo, "Discussion on Codebook Based UL Transmission", 3GPP TSG RAN WG1 Meeting #90bis R1-1717467, Oct. 9-13, 2017, pp. 1-7.

Catt, "Further discussion on codebook based transmission for UL", 3GPP TSG RAN WG1 Meeting 90bis R1-1717807, Oct. 9-13, 2017, pp. 1-5.

Ericsson, "UL MIMO for codebook based transmission", 3GPP TSG-RAN WG1 NR Ad Hoc #3 R1-1716341, Sep. 18-21, 2017, pp. 1-15.

* cited by examiner

DETERMINING A TPMI FOR A CODEBOOK SET

FIELD

The subject matter disclosed herein relates generally to wireless communications and more particularly relates to determining a transmit precoding matrix indication ("TPMI") for a codebook set.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Control Element ("CE"), Cyclic Prefix ("CP"), Cyclical Redundancy Check ("CRC"), Channel State Information ("CSI"), Common Search Space ("CS S"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Medium Access Control ("MAC"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Resource Element ("RE"), Radio Resource Control ("RRC"), Random Access Procedure ("RACH"), Random Access Response ("RAR"), Radio Link Failure ("RLF"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Scheduling Request Indicator ("SRI"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Sounding Reference Signal ("SRS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit Precoding Matrix Indication ("TPMI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a codebook may be used. In such networks, a variety of TPMIs may be used.

BRIEF SUMMARY

Methods for determining a TPMI for a codebook set are disclosed. Apparatuses and systems also perform the functions of the method. In one embodiment, the method includes receiving information indicating a transmission capability of a remote unit. In certain embodiments, the method includes determining a transmit precoding matrix indication based on a rank and a codebook corresponding to the transmission capability and the rank, wherein the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. In some embodiments, the method includes transmitting the transmit precoding matrix indication to the remote unit.

In one embodiment, the transmission capability is selected from the group including full-coherent transmission, partial-coherent transmission, and non-coherent transmission. In a further embodiment, the rank is selected from the group including a rank of one, a rank of two, a rank of three, and a rank of four.

In certain embodiments, the codebook corresponding to partial-coherent transmission and a rank of one includes entries selected from the group including $$\frac{1}{2}\begin{bmatrix}1\\1\\0\\0\end{bmatrix}$$

corresponding to a first index, $$\frac{1}{2}\begin{bmatrix}1\\-1\\0\\0\end{bmatrix}$$

corresponding to a second index, $$\frac{1}{2}\begin{bmatrix}1\\j\\0\\0\end{bmatrix}$$

corresponding to a third index, $$\frac{1}{2}\begin{bmatrix}1\\-j\\0\\0\end{bmatrix}$$

corresponding to a fourth index, $$\frac{1}{2}\begin{bmatrix}0\\0\\1\\1\end{bmatrix}$$

corresponding to a fifth index, $$\frac{1}{2}\begin{bmatrix}0\\0\\1\\-1\end{bmatrix}$$

corresponding to a sixth index, $$\frac{1}{2}\begin{bmatrix}0\\0\\1\\j\end{bmatrix}$$

corresponding to a seventh index, $$\frac{1}{2}\begin{bmatrix}0\\0\\1\\-j\end{bmatrix}$$

corresponding to an eighth index, $$\frac{1}{2}\begin{bmatrix}1\\0\\1\\0\end{bmatrix}$$

corresponding to a ninth index, $$\frac{1}{2}\begin{bmatrix}1\\0\\-1\\0\end{bmatrix}$$

corresponding to a tenth index, $$\frac{1}{2}\begin{bmatrix}1\\0\\j\\0\end{bmatrix}$$

corresponding to an eleventh index, $$\frac{1}{2}\begin{bmatrix}1\\0\\-j\\0\end{bmatrix}$$

corresponding to a twelfth index, $$\frac{1}{2}\begin{bmatrix}0\\1\\0\\1\end{bmatrix}$$

corresponding to a thirteenth index, $$\frac{1}{2}\begin{bmatrix}0\\1\\0\\-1\end{bmatrix}$$

corresponding to a fourteenth index, $$\frac{1}{2}\begin{bmatrix}0\\1\\0\\j\end{bmatrix}$$

corresponding to a fifteenth index, $$\frac{1}{2}\begin{bmatrix}0\\1\\0\\-j\end{bmatrix}$$

corresponding to a sixteenth index, $$\frac{1}{2}\begin{bmatrix}1\\0\\0\\0\end{bmatrix}$$

corresponding to a seventeenth index, $$\frac{1}{2}\begin{bmatrix} 0 \\ 1 \\ 0 \\ 0 \end{bmatrix}$$

corresponding to an eighteenth index, and $$\frac{1}{2}\begin{bmatrix} 0 \\ 0 \\ 1 \\ 0 \end{bmatrix}$$

corresponding to a nineteenth index, $$\frac{1}{2}\begin{bmatrix} 0 \\ 0 \\ 0 \\ 1 \end{bmatrix}$$

corresponding to a twentieth index.

In various embodiments, the codebook corresponding to partial-coherent transmission and a rank of two includes entries selected from the group including $$\frac{1}{2}\begin{bmatrix} 1 & 0 \\ 1 & 0 \\ 0 & 1 \\ 0 & -j \end{bmatrix}$$

corresponding to a first index, $$\frac{1}{2}\begin{bmatrix} 1 & 0 \\ 1 & 0 \\ 0 & 1 \\ 0 & j \end{bmatrix}$$

corresponding to a second index, $$\frac{1}{2}\begin{bmatrix} 1 & 0 \\ -j & 0 \\ 0 & 1 \\ 0 & 1 \end{bmatrix}$$

corresponding to a third index, $$\frac{1}{2}\begin{bmatrix} 1 & 0 \\ -j & 0 \\ 0 & 1 \\ 0 & -1 \end{bmatrix}$$

corresponding to a fourth index, $$\frac{1}{2}\begin{bmatrix} 1 & 0 \\ -1 & 0 \\ 0 & 1 \\ 0 & -j \end{bmatrix}$$

corresponding to a fifth index, $$\frac{1}{2}\begin{bmatrix} 1 & 0 \\ -1 & 0 \\ 0 & 1 \\ 0 & j \end{bmatrix}$$

corresponding to a sixth index, $$\frac{1}{2}\begin{bmatrix} 1 & 0 \\ j & 0 \\ 0 & 1 \\ 0 & 1 \end{bmatrix}$$

corresponding to a seventh index, $$\frac{1}{2}\begin{bmatrix} 1 & 0 \\ j & 0 \\ 0 & 1 \\ 0 & -1 \end{bmatrix}$$

corresponding to an eighth index, $$\frac{1}{2}\begin{bmatrix} 1 & 0 \\ 0 & 1 \\ 1 & 0 \\ 0 & 1 \end{bmatrix}$$

corresponding to a ninth index, $$\frac{1}{2}\begin{bmatrix} 1 & 0 \\ 0 & 1 \\ 1 & 0 \\ 0 & -1 \end{bmatrix}$$

corresponding to a tenth index, $$\frac{1}{2}\begin{bmatrix} 1 & 0 \\ 0 & 1 \\ -1 & 0 \\ 0 & 1 \end{bmatrix}$$

corresponding to an eleventh index, $$\frac{1}{2}\begin{bmatrix} 1 & 0 \\ 0 & 1 \\ -1 & 0 \\ 0 & -1 \end{bmatrix}$$

corresponding to a twelfth index, $$\frac{1}{2}\begin{bmatrix} 0 & 1 \\ 1 & 0 \\ 0 & 1 \\ 1 & 0 \end{bmatrix}$$

corresponding to a thirteenth index, $$\frac{1}{2}\begin{bmatrix} 0 & 1 \\ 1 & 0 \\ 0 & -1 \\ 1 & 0 \end{bmatrix}$$

corresponding to a fourteenth index, and $$\frac{1}{2}\begin{bmatrix} 0 & 1 \\ 1 & 0 \\ 0 & 1 \\ -1 & 0 \end{bmatrix}$$

corresponding to a fifteenth index, $$\frac{1}{2}\begin{bmatrix} 0 & 1 \\ 1 & 0 \\ 0 & -1 \\ -1 & 0 \end{bmatrix}$$

corresponding to a sixteenth index.

In some embodiments, the codebook corresponding to partial-coherent transmission and a rank of three includes entries selected from the group including $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index, $$\frac{1}{2}\begin{bmatrix} 1 & 0 & 0 \\ 0 & 1 & 0 \\ 1 & 0 & 0 \\ 0 & 0 & 1 \end{bmatrix}$$

corresponding to a fifth index, $$\frac{1}{2}\begin{bmatrix} 1 & 0 & 0 \\ 0 & 1 & 0 \\ -1 & 0 & 0 \\ 0 & 0 & 1 \end{bmatrix}$$

corresponding to a sixth index, $$\frac{1}{2}\begin{bmatrix} 0 & 1 & 0 \\ 1 & 0 & 0 \\ 0 & 0 & 1 \\ 1 & 0 & 0 \end{bmatrix}$$

corresponding to a seventh index, and $$\frac{1}{2}\begin{bmatrix} 0 & 1 & 0 \\ 1 & 0 & 0 \\ 0 & 0 & 1 \\ -1 & 0 & 0 \end{bmatrix}$$

corresponding to an eighth index.

In certain embodiments, the codebook corresponding to partial-coherent transmission and a rank of four includes $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

In some embodiments, the codebook corresponding to partial-coherent transmission and a rank of one includes entries selected from the group including $$\frac{1}{2}\begin{bmatrix}1\\1\\0\\0\end{bmatrix}$$

corresponding to a first index, $$\frac{1}{2}\begin{bmatrix}1\\-1\\0\\0\end{bmatrix}$$

corresponding to a second index, $$\frac{1}{2}\begin{bmatrix}1\\j\\0\\0\end{bmatrix}$$

corresponding to a third index, $$\frac{1}{2}\begin{bmatrix}1\\-j\\0\\0\end{bmatrix}$$

corresponding to a fourth index, $$\frac{1}{2}\begin{bmatrix}0\\0\\1\\1\end{bmatrix}$$

corresponding to a fifth index, $$\frac{1}{2}\begin{bmatrix}0\\0\\1\\-1\end{bmatrix}$$

corresponding to a sixth index, $$\frac{1}{2}\begin{bmatrix}0\\0\\1\\j\end{bmatrix}$$

corresponding to a seventh index, $$\frac{1}{2}\begin{bmatrix}0\\0\\1\\-j\end{bmatrix}$$

corresponding to an eighth index, $$\frac{1}{2}\begin{bmatrix}1\\0\\0\\0\end{bmatrix}$$

corresponding to a ninth index, $$\frac{1}{2}\begin{bmatrix}0\\1\\0\\0\end{bmatrix}$$

corresponding to a tenth index, $$\frac{1}{2}\begin{bmatrix}0\\0\\1\\0\end{bmatrix}$$

corresponding to an eleventh index, and $$\frac{1}{2}\begin{bmatrix}0\\0\\0\\1\end{bmatrix}$$

corresponding to a twelfth index.

In various embodiments, the codebook corresponding to partial-coherent transmission and a rank of two includes entries selected from the group including $$\frac{1}{2}\begin{bmatrix}1 & 0\\1 & 0\\0 & 1\\0 & -j\end{bmatrix}$$

corresponding to a first index, $$\frac{1}{2}\begin{bmatrix}1 & 0\\1 & 0\\0 & 1\\0 & j\end{bmatrix}$$

corresponding to a second index, $$\frac{1}{2}\begin{bmatrix} 1 & 0 \\ -j & 0 \\ 0 & 1 \\ 0 & 1 \end{bmatrix}$$

corresponding to a third index, $$\frac{1}{2}\begin{bmatrix} 1 & 0 \\ -j & 0 \\ 0 & 1 \\ 0 & -1 \end{bmatrix}$$

corresponding to a fourth index, $$\frac{1}{2}\begin{bmatrix} 1 & 0 \\ -1 & 0 \\ 0 & 1 \\ 0 & -j \end{bmatrix}$$

corresponding to a fifth index, $$\frac{1}{2}\begin{bmatrix} 1 & 0 \\ -1 & 0 \\ 0 & 1 \\ 0 & j \end{bmatrix}$$

corresponding to a sixth index, $$\frac{1}{2}\begin{bmatrix} 1 & 0 \\ j & 0 \\ 0 & 1 \\ 0 & 1 \end{bmatrix}$$

corresponding to a seventh index, and $$\frac{1}{2}\begin{bmatrix} 1 & 0 \\ j & 0 \\ 0 & 1 \\ 0 & -1 \end{bmatrix}$$

corresponding to an eighth index.

In certain embodiments, the codebook corresponding to partial-coherent transmission and a rank of three includes entries selected from the group including $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, and $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index.

In some embodiments, the codebook corresponding to non-coherent transmission and a rank of one includes entries selected from the group including $$\frac{1}{2}\begin{bmatrix} 1 \\ 0 \\ 0 \\ 0 \end{bmatrix}$$

corresponding to a first index, $$\frac{1}{2}\begin{bmatrix} 0 \\ 1 \\ 0 \\ 0 \end{bmatrix}$$

corresponding to a second index, $$\frac{1}{2}\begin{bmatrix} 0 \\ 0 \\ 1 \\ 0 \end{bmatrix}$$

corresponding to a third index, and $$\frac{1}{2}\begin{bmatrix} 0 \\ 0 \\ 0 \\ 1 \end{bmatrix}$$

corresponding to a fourth index.

In certain embodiments, the codebook corresponding to non-coherent transmission and a rank of two includes entries selected from the group including $$\frac{1}{2}\begin{bmatrix}1 & 0\\0 & 1\\0 & 0\\0 & 0\end{bmatrix}$$

corresponding to a first index, $$\frac{1}{2}\begin{bmatrix}1 & 0\\0 & 0\\0 & 1\\0 & 0\end{bmatrix}$$

corresponding to a second index, $$\frac{1}{2}\begin{bmatrix}1 & 0\\0 & 0\\0 & 0\\0 & 1\end{bmatrix}$$

corresponding to a third index, $$\frac{1}{2}\begin{bmatrix}0 & 0\\1 & 0\\0 & 1\\0 & 0\end{bmatrix}$$

corresponding to a fourth index, $$\frac{1}{2}\begin{bmatrix}0 & 0\\1 & 0\\0 & 0\\0 & 1\end{bmatrix}$$

corresponding to a fifth index, and $$\frac{1}{2}\begin{bmatrix}0 & 0\\0 & 0\\1 & 0\\0 & 1\end{bmatrix}$$

corresponding to a sixth index.

In various embodiments, the codebook corresponding to non-coherent transmission and a rank of three includes entries selected from the group including $$\frac{1}{2}\begin{bmatrix}1 & 0 & 0\\0 & 1 & 0\\0 & 0 & 1\\0 & 0 & 0\end{bmatrix}$$

corresponding to a first index, $$\frac{1}{2}\begin{bmatrix}1 & 0 & 0\\0 & 1 & 0\\0 & 0 & 0\\0 & 0 & 1\end{bmatrix}$$

corresponding to a second index, $$\frac{1}{2}\begin{bmatrix}1 & 0 & 0\\0 & 0 & 0\\0 & 1 & 0\\0 & 0 & 1\end{bmatrix}$$

corresponding to a third index, and $$\frac{1}{2}\begin{bmatrix}0 & 0 & 0\\1 & 0 & 0\\0 & 1 & 0\\0 & 0 & 1\end{bmatrix}$$

corresponding to a fourth index.

In some embodiments, the codebook corresponding to non-coherent transmission and a rank of four includes $$\frac{1}{2}\begin{bmatrix}1 & 0 & 0 & 0\\0 & 1 & 0 & 0\\0 & 0 & 1 & 0\\0 & 0 & 0 & 1\end{bmatrix}$$

corresponding to an index.

In various embodiments, the method includes receiving a subset indication from the remote unit, wherein the transmit precoding matrix indication corresponding to a rank of one includes four bits, the transmit precoding matrix indication corresponding to a rank of two includes three bits, and the transmit precoding matrix indication corresponding to a rank of three includes two bits.

In certain embodiments, the subset indication indicates remote unit ports that are coherent with each other. In one embodiment, the subset indication indicates portions of the codebook that are used for a corresponding subset. In some embodiments, remote unit ports that are coherent with each other is predetermined, and the transmit precoding matrix indication corresponding to a rank of one includes four bits, the transmit precoding matrix indication corresponding to a rank of two includes three bits, and the transmit precoding matrix indication corresponding to a rank of three includes two bits.

An apparatus for determining a TPMI for a codebook set, in one embodiment, includes a receiver that receives information indicating a transmission capability of a remote unit. In some embodiments, the apparatus includes a processor that determines a transmit precoding matrix indication based on a rank and a codebook corresponding to the transmission capability and the rank, wherein the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. In various embodiments, the apparatus includes a transmitter that transmits the transmit precoding matrix indication to the remote unit.

One method for determining a TPMI for a codebook set includes transmitting information indicating a transmission capability of a remote unit. In some embodiments, the method includes receiving a transmit precoding matrix indication from a base unit, wherein the transmit precoding matrix indication is based on a rank and a codebook corresponding to the transmission capability and the rank, the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits.

In one embodiment, the transmission capability is selected from the group including full-coherent transmission, partial-coherent transmission, and non-coherent transmission. In a further embodiment, the rank is selected from the group including a rank of one, a rank of two, a rank of three, and a rank of four.

In certain embodiments, the codebook corresponding to partial-coherent transmission and a rank of one includes entries selected from the group including $$\frac{1}{2}\begin{bmatrix}1\\1\\0\\0\end{bmatrix}$$

corresponding to a first index, $$\frac{1}{2}\begin{bmatrix}1\\-1\\0\\0\end{bmatrix}$$

corresponding to a second index, $$\frac{1}{2}\begin{bmatrix}1\\j\\0\\0\end{bmatrix}$$

corresponding to a third index, $$\frac{1}{2}\begin{bmatrix}1\\-j\\0\\0\end{bmatrix}$$

corresponding to a fourth index, $$\frac{1}{2}\begin{bmatrix}0\\0\\1\\1\end{bmatrix}$$

corresponding to a fifth index, $$\frac{1}{2}\begin{bmatrix}0\\0\\1\\-1\end{bmatrix}$$

corresponding to a sixth index, $$\frac{1}{2}\begin{bmatrix}0\\0\\1\\j\end{bmatrix}$$

corresponding to a seventh index, $$\frac{1}{2}\begin{bmatrix}0\\0\\1\\-j\end{bmatrix}$$

corresponding to an eighth index, $$\frac{1}{2}\begin{bmatrix}1\\0\\1\\0\end{bmatrix}$$

corresponding to a ninth index, $$\frac{1}{2}\begin{bmatrix}1\\0\\-1\\0\end{bmatrix}$$

corresponding to a tenth index, $$\frac{1}{2}\begin{bmatrix}1\\0\\j\\0\end{bmatrix}$$

corresponding to an eleventh index, $$\frac{1}{2}\begin{bmatrix}1\\0\\-j\\0\end{bmatrix}$$

corresponding to a twelfth index, $$\frac{1}{2}\begin{bmatrix}0\\1\\0\\1\end{bmatrix}$$

corresponding to a thirteenth index, $$\frac{1}{2}\begin{bmatrix}0\\1\\0\\-1\end{bmatrix}$$

corresponding to a fourteenth index, $$\frac{1}{2}\begin{bmatrix}0\\1\\0\\j\end{bmatrix}$$

corresponding to a fifteenth index, $$\frac{1}{2}\begin{bmatrix}0\\1\\0\\-j\end{bmatrix}$$

corresponding to a sixteenth index, $$\frac{1}{2}\begin{bmatrix}1\\0\\0\\0\end{bmatrix}$$

corresponding to a seventeenth index, $$\frac{1}{2}\begin{bmatrix}0\\1\\0\\0\end{bmatrix}$$

corresponding to an eighteenth index, and $$\frac{1}{2}\begin{bmatrix}0\\0\\1\\0\end{bmatrix}$$

corresponding to a nineteenth index, $$\frac{1}{2}\begin{bmatrix}0\\0\\0\\1\end{bmatrix}$$

corresponding to a twentieth index.

In various embodiments, the codebook corresponding to partial-coherent transmission and a rank of two includes entries selected from the group including $$\frac{1}{2}\begin{bmatrix}1&0\\1&0\\0&1\\0&-j\end{bmatrix}$$

corresponding to a first index, $$\frac{1}{2}\begin{bmatrix}1&0\\1&0\\0&1\\0&j\end{bmatrix}$$

corresponding to a second index, $$\frac{1}{2}\begin{bmatrix}1&0\\-j&0\\0&1\\0&1\end{bmatrix}$$

corresponding to a third index, $$\frac{1}{2}\begin{bmatrix}1&0\\-j&0\\0&1\\0&-1\end{bmatrix}$$

corresponding to a fourth index, $$\frac{1}{2}\begin{bmatrix}1&0\\-1&0\\0&1\\0&-j\end{bmatrix}$$

corresponding to a fifth index, $$\frac{1}{2}\begin{bmatrix} 1 & 0 \\ -1 & 0 \\ 0 & 1 \\ 0 & j \end{bmatrix}$$

corresponding to a sixth index, $$\frac{1}{2}\begin{bmatrix} 1 & 0 \\ j & 0 \\ 0 & 1 \\ 0 & 1 \end{bmatrix}$$

corresponding to a seventh index, $$\frac{1}{2}\begin{bmatrix} 1 & 0 \\ j & 0 \\ 0 & 1 \\ 0 & -1 \end{bmatrix}$$

corresponding to a eighth index, $$\frac{1}{2}\begin{bmatrix} 1 & 0 \\ 0 & 1 \\ 1 & 0 \\ 0 & 1 \end{bmatrix}$$

corresponding to a ninth index, $$\frac{1}{2}\begin{bmatrix} 1 & 0 \\ 0 & 1 \\ 1 & 0 \\ 0 & -1 \end{bmatrix}$$

corresponding to a tenth index, $$\frac{1}{2}\begin{bmatrix} 1 & 0 \\ 0 & 1 \\ -1 & 0 \\ 0 & 1 \end{bmatrix}$$

corresponding to an eleventh index, $$\frac{1}{2}\begin{bmatrix} 1 & 0 \\ 0 & 1 \\ -1 & 0 \\ 0 & 1 \end{bmatrix}$$

corresponding to a twelfth index, $$\frac{1}{2}\begin{bmatrix} 0 & 1 \\ 1 & 0 \\ 0 & 1 \\ 1 & 0 \end{bmatrix}$$

corresponding to a thirteenth index, $$\frac{1}{2}\begin{bmatrix} 0 & 1 \\ 1 & 0 \\ 0 & -1 \\ 1 & 0 \end{bmatrix}$$

corresponding to a fourteenth index, and $$\frac{1}{2}\begin{bmatrix} 0 & 1 \\ 1 & 0 \\ 0 & 1 \\ -1 & 0 \end{bmatrix}$$

corresponding to a fifteenth index, $$\frac{1}{2}\begin{bmatrix} 0 & 1 \\ 1 & 0 \\ 0 & -1 \\ -1 & 0 \end{bmatrix}$$

corresponding to a sixteenth index.

In some embodiments, the codebook corresponding to partial-coherent transmission and a rank of three includes entries selected from the group including $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index, $$\frac{1}{2}\begin{bmatrix} 1 & 0 & 0 \\ 0 & 1 & 0 \\ 1 & 0 & 0 \\ 0 & 0 & 1 \end{bmatrix}$$

corresponding to a fifth index, $$\frac{1}{2}\begin{bmatrix} 1 & 0 & 0 \\ 0 & 1 & 0 \\ -1 & 0 & 0 \\ 0 & 0 & 1 \end{bmatrix}$$

corresponding to a sixth index, $$\frac{1}{2}\begin{bmatrix} 0 & 1 & 0 \\ 1 & 0 & 0 \\ 0 & 0 & 1 \\ 1 & 0 & 0 \end{bmatrix}$$

corresponding to a seventh index, and $$\frac{1}{2}\begin{bmatrix} 0 & 1 & 0 \\ 1 & 0 & 0 \\ 0 & 0 & 1 \\ -1 & 0 & 0 \end{bmatrix}$$

corresponding to an eighth index.

In certain embodiments, the codebook corresponding to partial-coherent transmission and a rank of four includes $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

In some embodiments, the codebook corresponding to partial-coherent transmission and a rank of one includes entries selected from the group including $$\frac{1}{2}\begin{bmatrix} 1 \\ 1 \\ 0 \\ 0 \end{bmatrix}$$

corresponding to a first index, $$\frac{1}{2}\begin{bmatrix} 1 \\ -1 \\ 0 \\ 0 \end{bmatrix}$$

corresponding to a second index, $$\frac{1}{2}\begin{bmatrix} 1 \\ j \\ 0 \\ 0 \end{bmatrix}$$

corresponding to a third index, $$\frac{1}{2}\begin{bmatrix} 1 \\ -j \\ 0 \\ 0 \end{bmatrix}$$

corresponding to a fourth index, $$\frac{1}{2}\begin{bmatrix} 0 \\ 0 \\ 1 \\ 1 \end{bmatrix}$$

corresponding to a fifth index, $$\frac{1}{2}\begin{bmatrix} 0 \\ 0 \\ 1 \\ -1 \end{bmatrix}$$

corresponding to a sixth index, $$\frac{1}{2}\begin{bmatrix} 0 \\ 0 \\ 1 \\ j \end{bmatrix}$$

corresponding to a seventh index, $$\frac{1}{2}\begin{bmatrix} 0 \\ 0 \\ 1 \\ -j \end{bmatrix}$$

corresponding to an eighth index, $$\frac{1}{2}\begin{bmatrix}1\\0\\0\\0\end{bmatrix}$$

corresponding to a ninth index, $$\frac{1}{2}\begin{bmatrix}0\\1\\0\\0\end{bmatrix}$$

corresponding to a tenth index, $$\frac{1}{2}\begin{bmatrix}0\\0\\1\\0\end{bmatrix}$$

corresponding to an eleventh index, and $$\frac{1}{2}\begin{bmatrix}0\\0\\0\\1\end{bmatrix}$$

corresponding to a twelfth index.

In various embodiments, the codebook corresponding to partial-coherent transmission and a rank of two includes entries selected from the group including $$\frac{1}{2}\begin{bmatrix}1 & 0\\1 & 0\\0 & 1\\0 & -j\end{bmatrix}$$

corresponding to a first index, $$\frac{1}{2}\begin{bmatrix}1 & 0\\1 & 0\\0 & 1\\0 & j\end{bmatrix}$$

corresponding to a second index, $$\frac{1}{2}\begin{bmatrix}1 & 0\\-j & 0\\0 & 1\\0 & 1\end{bmatrix}$$

corresponding to a third index, $$\frac{1}{2}\begin{bmatrix}1 & 0\\-j & 0\\0 & 1\\0 & -1\end{bmatrix}$$

corresponding to a fourth index, $$\frac{1}{2}\begin{bmatrix}1 & 0\\-1 & 0\\0 & 1\\0 & -j\end{bmatrix}$$

corresponding to a fifth index, $$\frac{1}{2}\begin{bmatrix}1 & 0\\-1 & 0\\0 & 1\\0 & j\end{bmatrix}$$

corresponding to a sixth index, $$\frac{1}{2}\begin{bmatrix}1 & 0\\j & 0\\0 & 1\\0 & 1\end{bmatrix}$$

corresponding to a seventh index, and $$\frac{1}{2}\begin{bmatrix}1 & 0\\j & 0\\0 & 1\\0 & -1\end{bmatrix}$$

corresponding to an eighth index.

In certain embodiments, the codebook corresponding to partial-coherent transmission and a rank of three includes entries selected from the group including $$\frac{1}{2}\begin{bmatrix}1 & 0 & 0\\1 & 0 & 0\\0 & 1 & 0\\0 & 0 & 1\end{bmatrix}$$

corresponding to a first index, $$\frac{1}{2}\begin{bmatrix}1 & 0 & 0\\-1 & 0 & 0\\0 & 1 & 0\\0 & 0 & 1\end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, and $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index.

In some embodiments, the codebook corresponding to non-coherent transmission and a rank of one includes entries selected from the group including $$\frac{1}{2}\begin{bmatrix} 1 \\ 0 \\ 0 \\ 0 \end{bmatrix}$$

corresponding to a first index, $$\frac{1}{2}\begin{bmatrix} 0 \\ 1 \\ 0 \\ 0 \end{bmatrix}$$

corresponding to a second index, $$\frac{1}{2}\begin{bmatrix} 0 \\ 0 \\ 1 \\ 0 \end{bmatrix}$$

corresponding to a third index, and $$\frac{1}{2}\begin{bmatrix} 0 \\ 0 \\ 0 \\ 1 \end{bmatrix}$$

corresponding to a fourth index.

In certain embodiments, the codebook corresponding to non-coherent transmission and a rank of two includes entries selected from the group including $$\frac{1}{2}\begin{bmatrix} 1 & 0 \\ 0 & 1 \\ 0 & 0 \\ 0 & 0 \end{bmatrix}$$

corresponding to a first index, $$\frac{1}{2}\begin{bmatrix} 1 & 0 \\ 0 & 0 \\ 0 & 1 \\ 0 & 0 \end{bmatrix}$$

corresponding to a second index, $$\frac{1}{2}\begin{bmatrix} 1 & 0 \\ 0 & 0 \\ 0 & 0 \\ 0 & 1 \end{bmatrix}$$

corresponding to a third index, $$\frac{1}{2}\begin{bmatrix} 0 & 0 \\ 1 & 0 \\ 0 & 1 \\ 0 & 0 \end{bmatrix}$$

corresponding to a fourth index, $$\frac{1}{2}\begin{bmatrix} 0 & 0 \\ 1 & 0 \\ 0 & 0 \\ 0 & 1 \end{bmatrix}$$

corresponding to a fifth index, and $$\frac{1}{2}\begin{bmatrix} 0 & 0 \\ 0 & 0 \\ 1 & 0 \\ 0 & 1 \end{bmatrix}$$

corresponding to a sixth index.

In various embodiments, the codebook corresponding to non-coherent transmission and a rank of three includes entries selected from the group including $$\frac{1}{2}\begin{bmatrix} 1 & 0 & 0 \\ 0 & 1 & 0 \\ 0 & 0 & 1 \\ 0 & 0 & 0 \end{bmatrix}$$

corresponding to a first index, $$\frac{1}{2}\begin{bmatrix} 1 & 0 & 0 \\ 0 & 1 & 0 \\ 0 & 0 & 0 \\ 0 & 0 & 1 \end{bmatrix}$$

corresponding to a second index, $$\frac{1}{2}\begin{bmatrix} 1 & 0 & 0 \\ 0 & 0 & 0 \\ 0 & 1 & 0 \\ 0 & 0 & 1 \end{bmatrix}$$

corresponding to a third index, and $$\frac{1}{2}\begin{bmatrix} 0 & 0 & 0 \\ 1 & 0 & 0 \\ 0 & 1 & 0 \\ 0 & 0 & 1 \end{bmatrix}$$

corresponding to a fourth index.

In some embodiments, the codebook corresponding to non-coherent transmission and a rank of four includes $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

In various embodiments, the method includes transmitting a subset indication to the base unit, wherein the transmit precoding matrix indication corresponding to a rank of one includes four bits, the transmit precoding matrix indication corresponding to a rank of two includes three bits, and the transmit precoding matrix indication corresponding to a rank of three includes two bits.

In certain embodiments, the subset indication indicates remote unit ports that are coherent with each other. In one embodiment, the subset indication indicates portions of the codebook that are used for a corresponding subset. In some embodiments, remote unit ports that are coherent with each other is predetermined, and the transmit precoding matrix indication corresponding to a rank of one includes four bits, the transmit precoding matrix indication corresponding to a rank of two includes three bits, and the transmit precoding matrix indication corresponding to a rank of three includes two bits.

An apparatus for determining a TPMI for a codebook set, in one embodiment, includes a transmitter that transmits information indicating a transmission capability of a remote unit. In various embodiments, the apparatus includes a receiver that receives a transmit precoding matrix indication from a base unit, wherein the transmit precoding matrix indication is based on a rank and a codebook corresponding to the transmission capability and the rank, the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
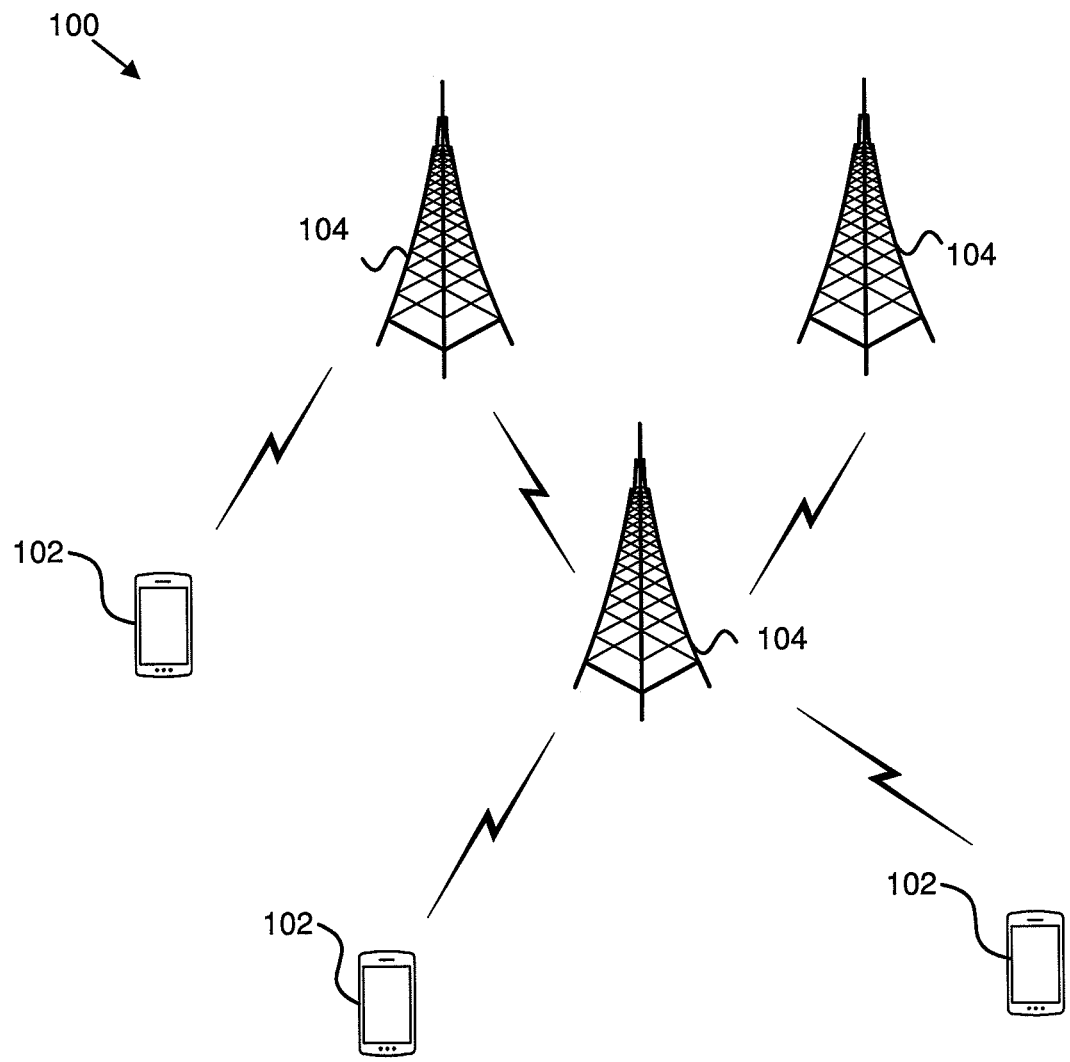
FIG. 1 is a schematic block diagram illustrating one embodiment of a wireless communication system for determining a TPMI for a codebook set.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a TPMI for a codebook set. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may transmit information indicating a transmission capability of the remote unit 102. In certain embodiments, the remote unit 102 may receive a transmit precoding matrix indication from a base unit 104, wherein the transmit precoding matrix indication is based on a rank and a codebook corresponding to the transmission capability and the rank, the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. Accordingly, a remote unit 102 may be used for receiving a TPMI for a codebook set.

In certain embodiments, a base unit 104 may receive information indicating a transmission capability of a remote unit 102. In various embodiments, the base unit 104 may determine a transmit precoding matrix indication based on a rank and a codebook corresponding to the transmission capability and the rank, wherein the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. In some embodiments, the base unit 104 may transmit the transmit precoding matrix indication to the remote unit. Accordingly, a base unit 104 may be used for determining a TPMI for a codebook set.

Figure 2:
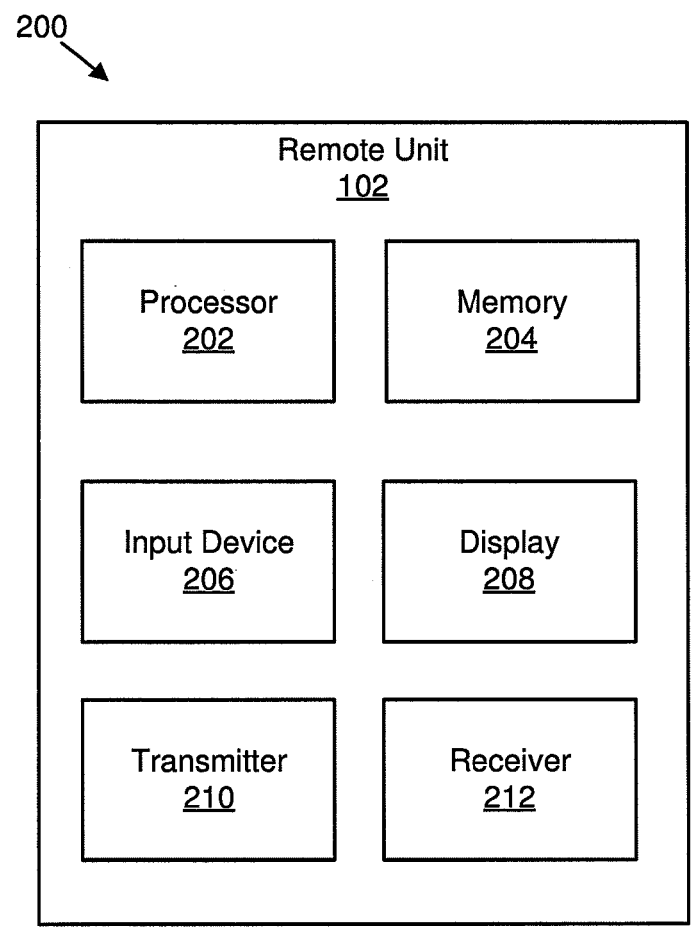
FIG. 2 is a schematic block diagram illustrating one embodiment of an apparatus that may be used for receiving a TPMI for a codebook set.

FIG. 2 depicts one embodiment of an apparatus 200 that may be used for receiving a TPMI for a codebook set. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102. In one embodiment, the memory 204 receives data at a buffer at a first time.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 may be used to transmit information indicating a transmission capability of a remote unit 102. In some embodiments, the receiver 212 may be used to receive a transmit precoding matrix indication from a base unit 104, wherein the transmit precoding matrix indication is based on a rank and a codebook corresponding to the transmission capability and the rank, the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
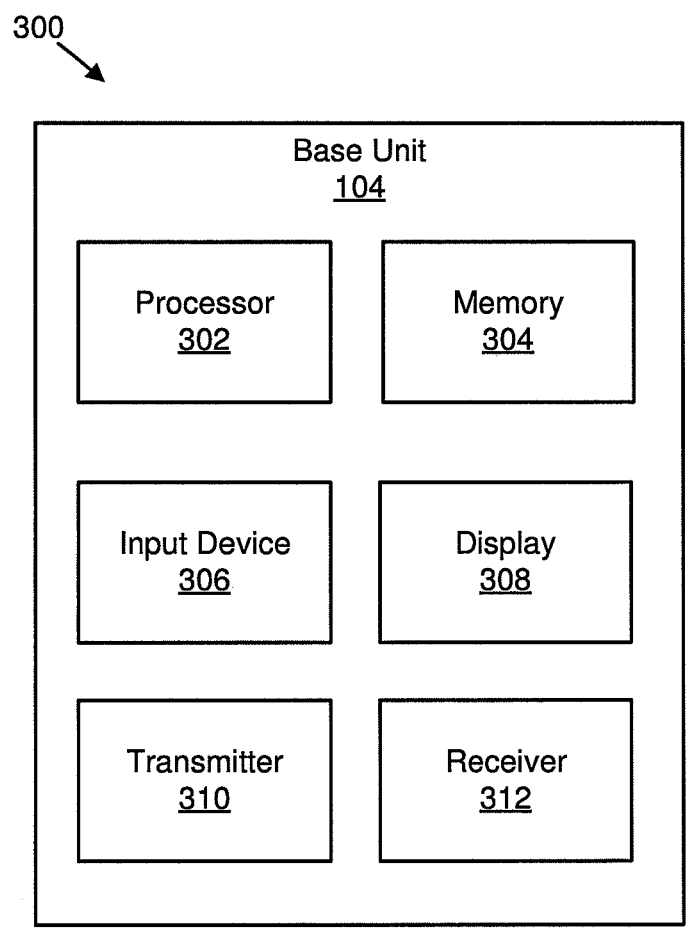
FIG. 3 is a schematic block diagram illustrating one embodiment of an apparatus that may be used for determining a TPMI for a codebook set.

FIG. 3 depicts one embodiment of an apparatus 300 that may be used for determining a TPMI for a codebook set. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive information indicating a transmission capability of a remote unit 102. In various embodiments, the processor 302 may determine a transmit precoding matrix indication based on a rank and a codebook corresponding to the transmission capability and the rank, wherein the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. In certain embodiments, the transmitter 310 may transmit the transmit precoding matrix indication to the remote unit 102. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, such as for full-coherent transmission a codebook may be as found in Table 1.

TABLE 1

| Codebook index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 1-continued

| Codebook index | $u_n$ | Number of layers $\upsilon$ | | | |
|---|---|---|---|---|---|
| | | 1 | 2 | 3 | 4 |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

As found in Table 1, $W_n^{\{s\}}$ denotes the matrix defined by the columns given by the set $\{s\}$ from the expression $W_n = I - 2u_n u_n^H / u_n^H u_n$ where I is a 4×4 identity.

In some embodiments, such as for partial coherent transmission, a codebook for rank 1 (e.g., 1 layer) is found in Table 2, a codebook for rank 2 (e.g., 2 layers) is found in Table 3, a codebook for rank 3 (e.g., 3 layers) is found in Table 4, and a codebook for rank 4 (e.g., 4 layers) is found in Table 5. In certain embodiments, out of 4 ports, the ports may be pair-wise coherent (e.g., coherent within a pair of two ports, but non-coherent between pairs of ports). For example, there may be transmission coherency between ports one and two and between ports three and four, but not between ports one and three and not between ports two and four. As another example, there may be transmission coherency between ports one and three and between ports two and four, but not between ports one and two and not between ports three and four.

TABLE 2

| Codebook index | Number of layers $\upsilon = 1$ |
|---|---|
| 0-7 | $\frac{1}{2}\begin{bmatrix}1\\1\\0\\0\end{bmatrix}$ $\frac{1}{2}\begin{bmatrix}1\\-1\\0\\0\end{bmatrix}$ $\frac{1}{2}\begin{bmatrix}1\\j\\0\\0\end{bmatrix}$ $\frac{1}{2}\begin{bmatrix}1\\-j\\0\\0\end{bmatrix}$ $\frac{1}{2}\begin{bmatrix}0\\0\\1\\1\end{bmatrix}$ $\frac{1}{2}\begin{bmatrix}0\\0\\1\\-1\end{bmatrix}$ $\frac{1}{2}\begin{bmatrix}0\\0\\1\\j\end{bmatrix}$ $\frac{1}{2}\begin{bmatrix}0\\0\\1\\-j\end{bmatrix}$ |
| 8-15 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |
| 16-19 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ |

TABLE 3

| Codebook index | Number of layers $\upsilon = 2$ |
|---|---|
| 0-3 | $\frac{1}{2}\begin{bmatrix}1 & 0\\1 & 0\\0 & 1\\0 & -j\end{bmatrix}$ $\frac{1}{2}\begin{bmatrix}1 & 0\\1 & 0\\0 & 1\\0 & j\end{bmatrix}$ $\frac{1}{2}\begin{bmatrix}1 & 0\\-j & 0\\0 & 1\\0 & 1\end{bmatrix}$ $\frac{1}{2}\begin{bmatrix}1 & 0\\-j & 0\\0 & 1\\0 & -1\end{bmatrix}$ |
| 4-7 | $\frac{1}{2}\begin{bmatrix}1 & 0\\-1 & 0\\0 & 1\\0 & -j\end{bmatrix}$ $\frac{1}{2}\begin{bmatrix}1 & 0\\-1 & 0\\0 & 1\\0 & j\end{bmatrix}$ $\frac{1}{2}\begin{bmatrix}1 & 0\\j & 0\\0 & 1\\0 & 1\end{bmatrix}$ $\frac{1}{2}\begin{bmatrix}1 & 0\\j & 0\\0 & 1\\0 & -1\end{bmatrix}$ |

TABLE 3-continued

| Codebook index | Number of layers $\upsilon = 2$ |
|---|---|
| 8-11 | $\frac{1}{2}\begin{bmatrix}1 & 0\\0 & 1\\1 & 0\\0 & 1\end{bmatrix}$ $\frac{1}{2}\begin{bmatrix}1 & 0\\0 & 1\\1 & 0\\0 & -1\end{bmatrix}$ $\frac{1}{2}\begin{bmatrix}1 & 0\\0 & 1\\-1 & 0\\0 & 1\end{bmatrix}$ $\frac{1}{2}\begin{bmatrix}1 & 0\\0 & 1\\-1 & 0\\0 & -1\end{bmatrix}$ |
| 12-15 | $\frac{1}{2}\begin{bmatrix}0 & 1\\1 & 0\\0 & 1\\1 & 0\end{bmatrix}$ $\frac{1}{2}\begin{bmatrix}0 & 1\\1 & 0\\0 & -1\\1 & 0\end{bmatrix}$ $\frac{1}{2}\begin{bmatrix}0 & 1\\1 & 0\\0 & 1\\-1 & 0\end{bmatrix}$ $\frac{1}{2}\begin{bmatrix}0 & 1\\1 & 0\\0 & -1\\-1 & 0\end{bmatrix}$ |

TABLE 4

| Codebook index | Number of layers $\upsilon = 3$ |
|---|---|
| 0-3 | $\frac{1}{2}\begin{bmatrix}1 & 0 & 0\\1 & 0 & 0\\0 & 1 & 0\\0 & 0 & 1\end{bmatrix}$ $\frac{1}{2}\begin{bmatrix}1 & 0 & 0\\-1 & 0 & 0\\0 & 1 & 0\\0 & 0 & 1\end{bmatrix}$ $\frac{1}{2}\begin{bmatrix}0 & 1 & 0\\0 & 0 & 1\\1 & 0 & 0\\1 & 0 & 0\end{bmatrix}$ $\frac{1}{2}\begin{bmatrix}0 & 1 & 0\\0 & 0 & 1\\1 & 0 & 0\\-1 & 0 & 0\end{bmatrix}$ |
| 4-7 | $\frac{1}{2}\begin{bmatrix}1 & 0 & 0\\0 & 1 & 0\\1 & 0 & 0\\0 & 0 & 1\end{bmatrix}$ $\frac{1}{2}\begin{bmatrix}1 & 0 & 0\\0 & 1 & 0\\-1 & 0 & 0\\0 & 0 & 1\end{bmatrix}$ $\frac{1}{2}\begin{bmatrix}0 & 1 & 0\\1 & 0 & 0\\0 & 0 & 1\\1 & 0 & 0\end{bmatrix}$ $\frac{1}{2}\begin{bmatrix}0 & 1 & 0\\1 & 0 & 0\\0 & 0 & 1\\-1 & 0 & 0\end{bmatrix}$ |

TABLE 5

| Codebook index | Number of layers $\upsilon = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

In various embodiments, such as for non-coherent transmission, a codebook for rank 1 (e.g., 1 layer) is found in Table 6, a codebook for rank 2 (e.g., 2 layers) is found in Table 7, a codebook for rank 3 (e.g., 3 layers) is found in Table 8, and a codebook for rank 4 (e.g., 4 layers) is found in Table 9. In some embodiments, with non-coherent transmission, no two ports are coherent with each other.

TABLE 6

| Codebook index | Number of layers $\upsilon = 1$ |
|---|---|
| 0-3 | $\frac{1}{2}\begin{bmatrix}1\\0\\0\\0\end{bmatrix}\ \frac{1}{2}\begin{bmatrix}0\\1\\0\\0\end{bmatrix}\ \frac{1}{2}\begin{bmatrix}0\\0\\1\\0\end{bmatrix}\ \frac{1}{2}\begin{bmatrix}0\\0\\0\\1\end{bmatrix}$ |

TABLE 7

| Codebook index | Number of layers $\upsilon = 2$ |
|---|---|
| 0-5 | $\frac{1}{2}\begin{bmatrix}1&0\\0&1\\0&0\\0&0\end{bmatrix}\ \frac{1}{2}\begin{bmatrix}1&0\\0&0\\0&1\\0&0\end{bmatrix}\ \frac{1}{2}\begin{bmatrix}1&0\\0&0\\0&0\\0&1\end{bmatrix}\ \frac{1}{2}\begin{bmatrix}0&0\\1&0\\0&1\\0&0\end{bmatrix}\ \frac{1}{2}\begin{bmatrix}0&0\\1&0\\0&0\\0&1\end{bmatrix}\ \frac{1}{2}\begin{bmatrix}0&0\\0&0\\1&0\\0&1\end{bmatrix}$ |

TABLE 8

| Codebook index | Number of layers $\upsilon = 3$ |
|---|---|
| 0-3 | $\frac{1}{2}\begin{bmatrix}1&0&0\\0&1&0\\0&0&1\\0&0&0\end{bmatrix}\ \frac{1}{2}\begin{bmatrix}1&0&0\\0&1&0\\0&0&0\\0&0&1\end{bmatrix}\ \frac{1}{2}\begin{bmatrix}1&0&0\\0&0&0\\0&1&0\\0&0&1\end{bmatrix}\ \frac{1}{2}\begin{bmatrix}0&0&0\\1&0&0\\0&1&0\\0&0&1\end{bmatrix}$ |

TABLE 9

| Codebook index | Number of layers $\upsilon = 4$ |
|---|---|
| 0 | $\frac{1}{2}\begin{bmatrix}1&0&0&0\\0&1&0&0\\0&0&1&0\\0&0&0&1\end{bmatrix}$ |

In various embodiments, a remote unit 102 may report its coherent transmission capability to a base unit 104. As set forth above, different coherent transmission capabilities may correspond to different codebook tables. For example, full-coherent transmission capability may correspond to the codebook found in Table 1. As another example, partial-coherent transmission capability may correspond to the codebooks found in Table 2, Table 3, Table 4, and Table 5.

As a further example, non-coherent transmission capability may correspond to Table 6, Table 7, Table 8, and Table 9.

In some embodiments, the base unit 104 may determine (e.g., calculate) TPMIs based on different codebook Tables corresponding to different remote unit 104 coherent transmission capabilities for PUSCH transmission.

In one embodiment of partial-coherent transmission, the base unit 104 may use a full TPMI indication. In such an embodiment, the base unit 104 may directly determine TPMIs based on Table 2, Table 3, Table 4, and Table 5. Furthermore, in such an embodiment, 5 bits may be used for each TPMI for rank 1, 4 bits may be used for each TPMI for rank 2, and 3 bits may be used for each TPMI for rank 3.

In another embodiment of partial-coherent transmission, the base unit 104 may use a codebook subset. In such an embodiment, a 1 bit codebook subset restriction parameter s (e.g., subset indication) may be used to indicate different codebook subset selections. The value of s may depend on remote unit 102 TX port numbering and/or coherence (e.g., which pair of ports are coherent). Furthermore, in such an embodiment, the value of s may be sent from the remote unit 102 to the base unit 104 for a partial-coherent remote unit 102.

In certain embodiments, the subset restriction parameter may be either a capability indicator on which pairs of remote units 102 are coherent as part of remote unit 102 capability, or a codebook subset indicator. For either type of indicator, the setting of the value s by the remote unit 102, and the usage of s by the base unit 104 may be substantially the same.

In some embodiments, the first and second remote unit 102 TX ports may be coherent, and the third and fourth remote unit 102 TX ports may be coherent. In such embodiments, the value of s may be set to 0 to indicate such a coherency configuration. Moreover, a subset of codebook indexes 0-7 and 16-19 from Table 2, codebook indexes 0-7 from Table 3, and codebook indexes 0-3 from Table 4 may be used to calculate TPMI. In various embodiments, the TPMI-related signaling field in an uplink DCI may be allocated based on a number of valid codebook entries after applying the codebook subset selection to the uplink codebook. In such embodiments, such as with the value of s set to 0, 4 bits may be used for each single TPMI for rank 1, 3 bits may be used for each single TPMI for rank 2, and 2 bits may be used for each single TPMI for rank 3. In certain embodiments, the codebook index may equal TPMI in Table 2 with a TPMI less than 8 and the codebook index may equal TPMI+8 in Table 2 with a TPMI larger than 7 for PUSCH transmission. Moreover, in some embodiments, the codebook index may equal TPMI in Table 3 and Table 4 for PUSCH transmission.

In various embodiments, the first and third remote unit 102 TX ports may be coherent, and the second and fourth remote unit 102 TX ports may be coherent. In such embodiments, the value of s may be set to 1 to indicate such a coherency configuration. Moreover, a subset of codebook indexes 8-19 from Table 2, codebook indexes 8-15 in Table 3, and codebook indexes 4-7 in Table 4 may be used to calculate TPMI. In various embodiments, the TPMI-related signaling field in an uplink DCI may be allocated based on a number of valid codebook entries after applying the codebook subset selection to the uplink codebook. In such embodiments, such as with the value of s set to 1, 4 bits may be used for each TPMI for rank 1, 3 bits may be used for each TPMI for rank 2, and 2 bits may be used for each TPMI for rank 3. In certain embodiments, the codebook index may equal TPMI+8 in Table 2 and Table 3, and the codebook index may equal TPMI+4 in Table 4 for PUSCH transmission.

In a further embodiment of partial-coherent transmission, SRS port number sequences may be predetermined (e.g., via specification, signaling, etc.). In such an embodiment, in response to 4 SRS ports being configured in one SRS resource with partial-coherent transmission capability, SRS port 0 and SRS port 1 may be coherent, and SRS port 2 and SRS port 3 may be coherent. Moreover, the base unit 104 may determine TPMI based on Table 10, Table 11, and Table 12.

In one embodiment, in response to a remote unit 102 only supporting non-coherent transmission, a base unit 104 may determine the TPMI based on Table 6, Table 7, Table 8, and Table 9 and may indicate the TPMI to the remote unit 102 for PUSCH transmission.

Figure 4:
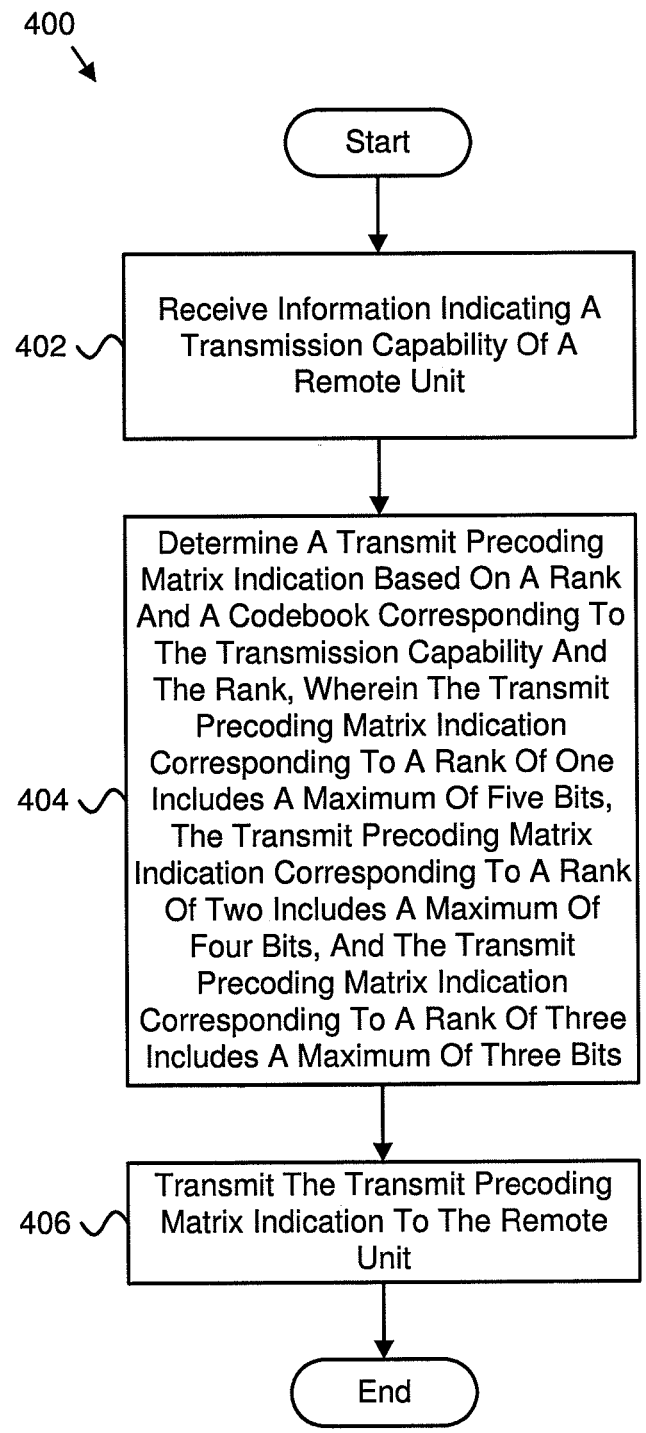
FIG. 4 is a schematic flow chart diagram illustrating one embodiment of a method for determining a TPMI for a codebook set.

FIG. 4 is a schematic flow chart diagram illustrating one embodiment of a method 400 for determining a TPMI for a codebook set. In some embodiments, the method 400 is to be performed by an apparatus, such as the base unit 104. In certain embodiments, the method 400 may be performed by a processor executing program code, for example, a microcontroller, a microprocessor, a CPU, a GPU, an auxiliary processing unit, a FPGA, or the like.

The method 400 may include receiving 402 information indicating a transmission capability of a remote unit. In certain embodiments, the method 400 includes determining 404 a transmit precoding matrix indication based on a rank and a codebook corresponding to the transmission capability and the rank, wherein the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits. In some embodiments, the method 400 includes transmitting 406 the transmit precoding matrix indication to the remote unit.

In one embodiment, the transmission capability is selected from the group including full-coherent transmission, partial-coherent transmission, and non-coherent transmission. In a further embodiment, the rank is selected from the group including a rank of one, a rank of two, a rank of three, and a rank of four.

In certain embodiments, the codebook corresponding to partial-coherent transmission and a rank of one includes entries selected from the group including $$\frac{1}{2}\begin{bmatrix}1\\1\\0\\0\end{bmatrix}$$

corresponding to a first index, $$\frac{1}{2}\begin{bmatrix}1\\-1\\0\\0\end{bmatrix}$$

corresponding to a second index,

TABLE 10

| Codebook index | Number of layers υ = 1 |
|---|---|
| 0-7 | $\frac{1}{2}\begin{bmatrix}1\\1\\0\\0\end{bmatrix}\ \frac{1}{2}\begin{bmatrix}1\\-1\\0\\0\end{bmatrix}\ \frac{1}{2}\begin{bmatrix}1\\j\\0\\0\end{bmatrix}\ \frac{1}{2}\begin{bmatrix}1\\-j\\0\\0\end{bmatrix}\ \frac{1}{2}\begin{bmatrix}0\\0\\1\\1\end{bmatrix}\ \frac{1}{2}\begin{bmatrix}0\\0\\1\\-1\end{bmatrix}\ \frac{1}{2}\begin{bmatrix}0\\0\\1\\j\end{bmatrix}\ \frac{1}{2}\begin{bmatrix}0\\0\\1\\-j\end{bmatrix}$ |
| 8-11 | $\frac{1}{2}\begin{bmatrix}1\\0\\0\\0\end{bmatrix}\ \frac{1}{2}\begin{bmatrix}0\\1\\0\\0\end{bmatrix}\ \frac{1}{2}\begin{bmatrix}0\\0\\1\\0\end{bmatrix}\ \frac{1}{2}\begin{bmatrix}0\\0\\0\\1\end{bmatrix}$ |

TABLE 11

| Codebook index | Number of layers υ = 2 |
|---|---|
| 0-3 | $\frac{1}{2}\begin{bmatrix}1&0\\1&0\\0&1\\0&-j\end{bmatrix}\ \frac{1}{2}\begin{bmatrix}1&0\\1&0\\0&1\\0&j\end{bmatrix}\ \frac{1}{2}\begin{bmatrix}1&0\\-j&0\\0&1\\0&1\end{bmatrix}\ \frac{1}{2}\begin{bmatrix}1&0\\-j&0\\0&1\\0&-1\end{bmatrix}$ |
| 4-7 | $\frac{1}{2}\begin{bmatrix}1&0\\-1&0\\0&1\\0&-j\end{bmatrix}\ \frac{1}{2}\begin{bmatrix}1&0\\-1&0\\0&1\\0&j\end{bmatrix}\ \frac{1}{2}\begin{bmatrix}1&0\\j&0\\0&1\\0&1\end{bmatrix}\ \frac{1}{2}\begin{bmatrix}1&0\\j&0\\0&1\\0&-1\end{bmatrix}$ |

TABLE 12

| Codebook index | Number of layers υ = 3 |
|---|---|
| 0-3 | $\frac{1}{2}\begin{bmatrix}1&0&0\\1&0&0\\0&1&0\\0&0&1\end{bmatrix}\ \frac{1}{2}\begin{bmatrix}1&0&0\\-1&0&0\\0&1&0\\0&0&1\end{bmatrix}\ \frac{1}{2}\begin{bmatrix}0&1&0\\0&0&1\\1&0&0\\1&0&0\end{bmatrix}\ \frac{1}{2}\begin{bmatrix}0&1&0\\0&0&1\\1&0&0\\-1&0&0\end{bmatrix}$ |

$$\frac{1}{2}\begin{bmatrix}1\\j\\0\\0\end{bmatrix}$$

corresponding to a third index, $$\frac{1}{2}\begin{bmatrix}1\\-j\\0\\0\end{bmatrix}$$

corresponding to a fourth index, $$\frac{1}{2}\begin{bmatrix}0\\0\\1\\1\end{bmatrix}$$

corresponding to a fifth index, $$\frac{1}{2}\begin{bmatrix}0\\0\\1\\-1\end{bmatrix}$$

corresponding to a sixth index, $$\frac{1}{2}\begin{bmatrix}0\\0\\1\\j\end{bmatrix}$$

corresponding to a seventh index, $$\frac{1}{2}\begin{bmatrix}0\\0\\1\\-j\end{bmatrix}$$

corresponding to an eighth index, $$\frac{1}{2}\begin{bmatrix}1\\0\\1\\0\end{bmatrix}$$

corresponding to a ninth index, $$\frac{1}{2}\begin{bmatrix}1\\0\\-1\\0\end{bmatrix}$$

corresponding to a tenth index, $$\frac{1}{2}\begin{bmatrix}1\\0\\j\\0\end{bmatrix}$$

corresponding to an eleventh index, $$\frac{1}{2}\begin{bmatrix}1\\0\\-j\\0\end{bmatrix}$$

corresponding to a twelfth index, $$\frac{1}{2}\begin{bmatrix}0\\1\\0\\1\end{bmatrix}$$

corresponding to a thirteenth index, $$\frac{1}{2}\begin{bmatrix}0\\1\\0\\-1\end{bmatrix}$$

corresponding to a fourteenth index, $$\frac{1}{2}\begin{bmatrix}0\\1\\0\\j\end{bmatrix}$$

corresponding to a fifteenth index, $$\frac{1}{2}\begin{bmatrix}0\\1\\0\\-j\end{bmatrix}$$

corresponding to a sixteenth index, $$\frac{1}{2}\begin{bmatrix}1\\0\\0\\0\end{bmatrix}$$

corresponding to a seventeenth index, $$\frac{1}{2}\begin{bmatrix}0\\1\\0\\0\end{bmatrix}$$

corresponding to an eighteenth index, and $$\frac{1}{2}\begin{bmatrix}0\\0\\1\\0\end{bmatrix}$$

corresponding to a nineteenth index, $$\frac{1}{2}\begin{bmatrix}0\\0\\0\\1\end{bmatrix}$$

corresponding to a twentieth index.

In various embodiments, the codebook corresponding to partial-coherent transmission and a rank of two includes entries selected from the group including $$\frac{1}{2}\begin{bmatrix}1&0\\1&0\\0&1\\0&-j\end{bmatrix}$$

corresponding to a first index, $$\frac{1}{2}\begin{bmatrix}1&0\\1&0\\0&1\\0&j\end{bmatrix}$$

corresponding to a second index, $$\frac{1}{2}\begin{bmatrix}1&0\\-j&0\\0&1\\0&1\end{bmatrix}$$

corresponding to a third index, $$\frac{1}{2}\begin{bmatrix}1&0\\-j&0\\0&1\\0&-1\end{bmatrix}$$

corresponding to a fourth index, $$\frac{1}{2}\begin{bmatrix}1&0\\-1&0\\0&1\\0&-j\end{bmatrix}$$

corresponding to a fifth index, $$\frac{1}{2}\begin{bmatrix}1&0\\-1&0\\0&1\\0&j\end{bmatrix}$$

corresponding to a sixth index, $$\frac{1}{2}\begin{bmatrix}1&0\\j&0\\0&1\\0&1\end{bmatrix}$$

corresponding to a seventh index, $$\frac{1}{2}\begin{bmatrix}1&0\\j&0\\0&1\\0&-1\end{bmatrix}$$

corresponding to an eighth index, $$\frac{1}{2}\begin{bmatrix}1&0\\0&1\\1&0\\0&1\end{bmatrix}$$

corresponding to a ninth index, $$\frac{1}{2}\begin{bmatrix}1&0\\0&1\\1&0\\0&-1\end{bmatrix}$$

corresponding to a tenth index, $$\frac{1}{2}\begin{bmatrix} 1 & 0 \\ 0 & 1 \\ -1 & 0 \\ 0 & 1 \end{bmatrix}$$

corresponding to an eleventh index, $$\frac{1}{2}\begin{bmatrix} 1 & 0 \\ 0 & 1 \\ -1 & 0 \\ 0 & -1 \end{bmatrix}$$

corresponding to a twelfth index, $$\frac{1}{2}\begin{bmatrix} 0 & 1 \\ 1 & 0 \\ 0 & 1 \\ 1 & 0 \end{bmatrix}$$

corresponding to a thirteenth index, $$\frac{1}{2}\begin{bmatrix} 0 & 1 \\ 1 & 0 \\ 0 & -1 \\ 1 & 0 \end{bmatrix}$$

corresponding to a fourteenth index, and $$\frac{1}{2}\begin{bmatrix} 0 & 1 \\ 1 & 0 \\ 0 & 1 \\ -1 & 0 \end{bmatrix}$$

corresponding to a fifteenth index, $$\frac{1}{2}\begin{bmatrix} 0 & 1 \\ 1 & 0 \\ 0 & -1 \\ -1 & 0 \end{bmatrix}$$

corresponding to a sixteenth index.

In some embodiments, the codebook corresponding to partial-coherent transmission and a rank of three includes entries selected from the group including $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index, $$\frac{1}{2}\begin{bmatrix} 1 & 0 & 0 \\ 0 & 1 & 0 \\ 1 & 0 & 0 \\ 0 & 0 & 1 \end{bmatrix}$$

corresponding to a fifth index, $$\frac{1}{2}\begin{bmatrix} 1 & 0 & 0 \\ 0 & 1 & 0 \\ -1 & 0 & 0 \\ 0 & 0 & 1 \end{bmatrix}$$

corresponding to a sixth index, $$\frac{1}{2}\begin{bmatrix} 0 & 1 & 0 \\ 1 & 0 & 0 \\ 0 & 0 & 1 \\ 1 & 0 & 0 \end{bmatrix}$$

corresponding to a seventh index, and $$\frac{1}{2}\begin{bmatrix} 0 & 1 & 0 \\ 1 & 0 & 0 \\ 0 & 0 & 1 \\ -1 & 0 & 0 \end{bmatrix}$$

corresponding to an eighth index.

In certain embodiments, the codebook corresponding to partial-coherent transmission and a rank of four includes $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

In some embodiments, the codebook corresponding to partial-coherent transmission and a rank of one includes entries selected from the group including $$\frac{1}{2}\begin{bmatrix} 1 \\ 1 \\ 0 \\ 0 \end{bmatrix}$$

corresponding to a first index, $$\frac{1}{2}\begin{bmatrix} 1 \\ -1 \\ 0 \\ 0 \end{bmatrix}$$

corresponding to a second index, $$\frac{1}{2}\begin{bmatrix} 1 \\ j \\ 0 \\ 0 \end{bmatrix}$$

corresponding to a third index, $$\frac{1}{2}\begin{bmatrix} 1 \\ -j \\ 0 \\ 0 \end{bmatrix}$$

corresponding to a fourth index, $$\frac{1}{2}\begin{bmatrix} 0 \\ 0 \\ 1 \\ 1 \end{bmatrix}$$

corresponding to a fifth index, $$\frac{1}{2}\begin{bmatrix} 0 \\ 0 \\ 1 \\ -1 \end{bmatrix}$$

corresponding to a sixth index, $$\frac{1}{2}\begin{bmatrix} 0 \\ 0 \\ 1 \\ j \end{bmatrix}$$

corresponding to a seventh index, $$\frac{1}{2}\begin{bmatrix} 0 \\ 0 \\ 1 \\ -j \end{bmatrix}$$

corresponding to an eighth index, $$\frac{1}{2}\begin{bmatrix} 1 \\ 0 \\ 0 \\ 0 \end{bmatrix}$$

corresponding to a ninth index, $$\frac{1}{2}\begin{bmatrix} 0 \\ 1 \\ 0 \\ 0 \end{bmatrix}$$

corresponding to a tenth index, $$\frac{1}{2}\begin{bmatrix} 0 \\ 0 \\ 1 \\ 0 \end{bmatrix}$$

corresponding to an eleventh index, and $$\frac{1}{2}\begin{bmatrix} 0 \\ 0 \\ 0 \\ 1 \end{bmatrix}$$

corresponding to a twelfth index.

In various embodiments, the codebook corresponding to partial-coherent transmission and a rank of two includes entries selected from the group including $$\frac{1}{2}\begin{bmatrix} 1 & 0 \\ 1 & 0 \\ 0 & 1 \\ 0 & -j \end{bmatrix}$$

corresponding to a first index, $$\frac{1}{2}\begin{bmatrix} 1 & 0 \\ 1 & 0 \\ 0 & 1 \\ 0 & j \end{bmatrix}$$

corresponding to a second index, $$\frac{1}{2}\begin{bmatrix} 1 & 0 \\ -j & 0 \\ 0 & 1 \\ 0 & 1 \end{bmatrix}$$

corresponding to a third index, $$\frac{1}{2}\begin{bmatrix} 1 & 0 \\ -j & 0 \\ 0 & 1 \\ 0 & -1 \end{bmatrix}$$

corresponding to a fourth index, $$\frac{1}{2}\begin{bmatrix} 1 & 0 \\ -1 & 0 \\ 0 & 1 \\ 0 & -j \end{bmatrix}$$

corresponding to a fifth index, $$\frac{1}{2}\begin{bmatrix} 1 & 0 \\ -1 & 0 \\ 0 & 1 \\ 0 & j \end{bmatrix}$$

corresponding to a sixth index, $$\frac{1}{2}\begin{bmatrix} 1 & 0 \\ j & 0 \\ 0 & 1 \\ 0 & 1 \end{bmatrix}$$

corresponding to a seventh index, and $$\frac{1}{2}\begin{bmatrix} 1 & 0 \\ j & 0 \\ 0 & 1 \\ 0 & -1 \end{bmatrix}$$

corresponding to an eighth index.

In certain embodiments, the codebook corresponding to partial-coherent transmission and a rank of three includes entries selected from the group including $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, and $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index.

In some embodiments, the codebook corresponding to non-coherent transmission and a rank of one includes entries selected from the group including $$\frac{1}{2}\begin{bmatrix} 1 \\ 0 \\ 0 \\ 0 \end{bmatrix}$$

corresponding to a first index, $$\frac{1}{2}\begin{bmatrix} 0 \\ 1 \\ 0 \\ 0 \end{bmatrix}$$

corresponding to a second index, $$\frac{1}{2}\begin{bmatrix} 0 \\ 0 \\ 1 \\ 0 \end{bmatrix}$$

corresponding to a third index, and $$\frac{1}{2}\begin{bmatrix} 0 \\ 0 \\ 0 \\ 1 \end{bmatrix}$$

corresponding to a fourth index.

In certain embodiments, the codebook corresponding to non-coherent transmission and a rank of two includes entries selected from the group including $$\frac{1}{2}\begin{bmatrix} 1 & 0 \\ 0 & 1 \\ 0 & 0 \\ 0 & 0 \end{bmatrix}$$

corresponding to a first index, $$\frac{1}{2}\begin{bmatrix} 1 & 0 \\ 0 & 0 \\ 0 & 1 \\ 0 & 0 \end{bmatrix}$$

corresponding to a second index, $$\frac{1}{2}\begin{bmatrix} 1 & 0 \\ 0 & 0 \\ 0 & 0 \\ 0 & 1 \end{bmatrix}$$

corresponding to a third index, $$\frac{1}{2}\begin{bmatrix} 0 & 0 \\ 1 & 0 \\ 0 & 1 \\ 0 & 0 \end{bmatrix}$$

corresponding to a fourth index, $$\frac{1}{2}\begin{bmatrix} 0 & 0 \\ 1 & 0 \\ 0 & 0 \\ 0 & 1 \end{bmatrix}$$

corresponding to a fifth index, and $$\frac{1}{2}\begin{bmatrix} 0 & 0 \\ 0 & 0 \\ 1 & 0 \\ 0 & 1 \end{bmatrix}$$

corresponding to a sixth index.

In various embodiments, the codebook corresponding to non-coherent transmission and a rank of three includes entries selected from the group including $$\frac{1}{2}\begin{bmatrix} 1 & 0 & 0 \\ 0 & 1 & 0 \\ 0 & 0 & 1 \\ 0 & 0 & 0 \end{bmatrix}$$

corresponding to a first index, $$\frac{1}{2}\begin{bmatrix} 1 & 0 & 0 \\ 0 & 1 & 0 \\ 0 & 0 & 0 \\ 0 & 0 & 1 \end{bmatrix}$$

corresponding to a second index, $$\frac{1}{2}\begin{bmatrix} 1 & 0 & 0 \\ 0 & 0 & 0 \\ 0 & 1 & 0 \\ 0 & 0 & 1 \end{bmatrix}$$

corresponding to a third index, and $$\frac{1}{2}\begin{bmatrix} 0 & 0 & 0 \\ 1 & 0 & 0 \\ 0 & 1 & 0 \\ 0 & 0 & 1 \end{bmatrix}$$

corresponding to a fourth index.

In some embodiments, the codebook corresponding to non-coherent transmission and a rank of four includes $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

In various embodiments, the method 400 includes receiving a subset indication from the remote unit, wherein the transmit precoding matrix indication corresponding to a rank of one includes four bits, the transmit precoding matrix indication corresponding to a rank of two includes three bits, and the transmit precoding matrix indication corresponding to a rank of three includes two bits.

In certain embodiments, the subset indication indicates remote unit ports that are coherent with each other. In one embodiment, the subset indication indicates portions of the codebook that are used for a corresponding subset. In some embodiments, remote unit ports that are coherent with each other is predetermined, and the transmit precoding matrix indication corresponding to a rank of one includes four bits, the transmit precoding matrix indication corresponding to a rank of two includes three bits, and the transmit precoding matrix indication corresponding to a rank of three includes two bits.

Figure 5:
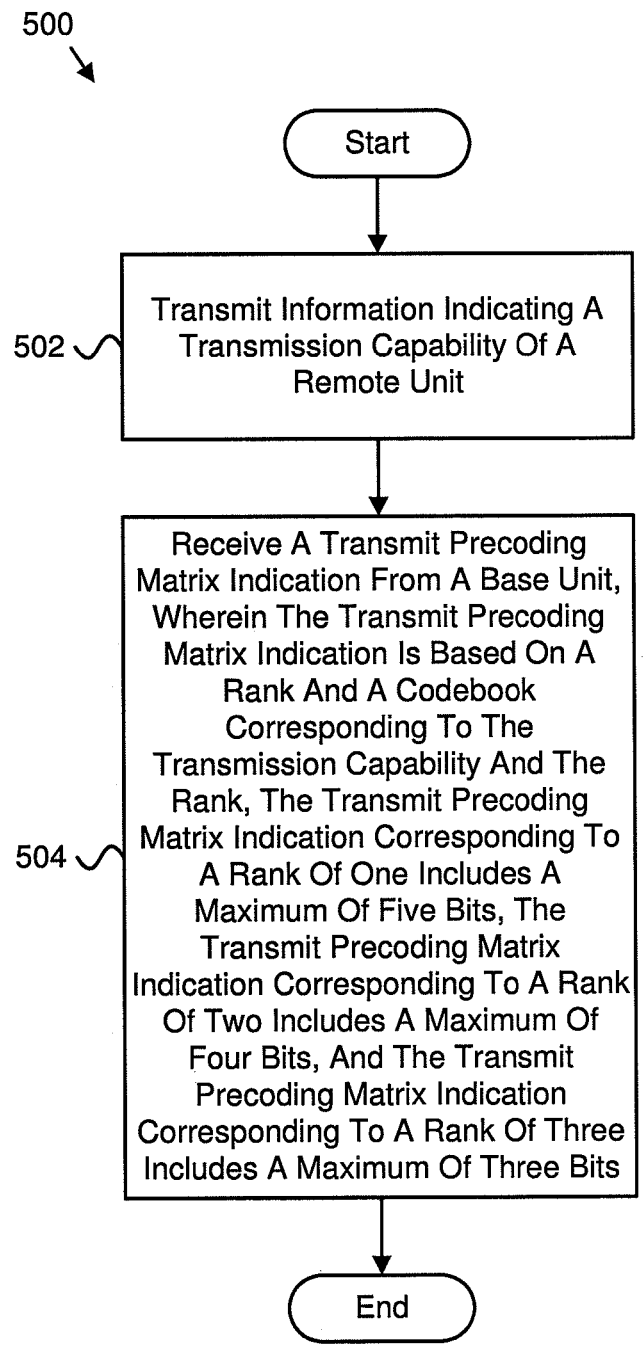
FIG. 5 is a schematic flow chart diagram illustrating one embodiment of a method for receiving a TPMI for a codebook set.

FIG. 5 is a schematic flow chart diagram illustrating one embodiment of a method 500 for receiving a TPMI for a codebook set. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 information indicating a transmission capability of a remote unit. The method 500 includes receiving 504 a transmit precoding matrix indication from a base unit, wherein the transmit precoding matrix indication is based on a rank and a codebook corresponding to the transmission capability and the rank, the transmit precoding matrix indication corresponding to a rank of one includes a maximum of five bits, the transmit precoding matrix indication corresponding to a rank of two includes a maximum of four bits, and the transmit precoding matrix indication corresponding to a rank of three includes a maximum of three bits.

In one embodiment, the transmission capability is selected from the group including full-coherent transmission, partial-coherent transmission, and non-coherent transmission. In a further embodiment, the rank is selected from the group including a rank of one, a rank of two, a rank of three, and a rank of four.

In certain embodiments, the codebook corresponding to partial-coherent transmission and a rank of one includes entries selected from the group including $$\frac{1}{2}\begin{bmatrix}1\\1\\0\\0\end{bmatrix}$$

corresponding to a first index, $$\frac{1}{2}\begin{bmatrix}1\\-1\\0\\0\end{bmatrix}$$

corresponding to a second index, $$\frac{1}{2}\begin{bmatrix}1\\j\\0\\0\end{bmatrix}$$

corresponding to a third index, $$\frac{1}{2}\begin{bmatrix}1\\-j\\0\\0\end{bmatrix}$$

corresponding to a fourth index, $$\frac{1}{2}\begin{bmatrix}0\\0\\1\\1\end{bmatrix}$$

corresponding to a fifth index, $$\frac{1}{2}\begin{bmatrix}0\\0\\1\\-1\end{bmatrix}$$

corresponding to a sixth index, $$\frac{1}{2}\begin{bmatrix}0\\0\\1\\j\end{bmatrix}$$

corresponding to a seventh index, $$\frac{1}{2}\begin{bmatrix}0\\0\\1\\-j\end{bmatrix}$$

corresponding to an eighth index, $$\frac{1}{2}\begin{bmatrix}1\\0\\1\\0\end{bmatrix}$$

corresponding to a ninth index, $$\frac{1}{2}\begin{bmatrix}1\\0\\-1\\0\end{bmatrix}$$

corresponding to a tenth index, $$\frac{1}{2}\begin{bmatrix}1\\0\\j\\0\end{bmatrix}$$

corresponding to an eleventh index, $$\frac{1}{2}\begin{bmatrix}1\\0\\-j\\0\end{bmatrix}$$

corresponding to a twelfth index, $$\frac{1}{2}\begin{bmatrix}0\\1\\0\\1\end{bmatrix}$$

corresponding to a thirteenth index, $$\frac{1}{2}\begin{bmatrix}0\\1\\0\\-1\end{bmatrix}$$

corresponding to a fourteenth index, $$\frac{1}{2}\begin{bmatrix}0\\1\\0\\j\end{bmatrix}$$

corresponding to a fifteenth index, $$\frac{1}{2}\begin{bmatrix}0\\1\\0\\-j\end{bmatrix}$$

corresponding to a sixteenth index, $$\frac{1}{2}\begin{bmatrix}1\\0\\0\\0\end{bmatrix}$$

corresponding to a seventeenth index, $$\frac{1}{2}\begin{bmatrix}0\\1\\0\\0\end{bmatrix}$$

corresponding to an eighteenth index, and $$\frac{1}{2}\begin{bmatrix}0\\0\\1\\0\end{bmatrix}$$

corresponding to a nineteenth index, $$\frac{1}{2}\begin{bmatrix}0\\0\\0\\1\end{bmatrix}$$

corresponding to a twentieth index.

In various embodiments, the codebook corresponding to partial-coherent transmission and a rank of two includes entries selected from the group including $$\frac{1}{2}\begin{bmatrix}1 & 0\\1 & 0\\0 & 1\\0 & -j\end{bmatrix}$$

corresponding to a first index, $$\frac{1}{2}\begin{bmatrix}1 & 0\\1 & 0\\0 & 1\\0 & j\end{bmatrix}$$

corresponding to a second index, $$\frac{1}{2}\begin{bmatrix}1 & 0\\-j & 0\\0 & 1\\0 & 1\end{bmatrix}$$

corresponding to a third index, $$\frac{1}{2}\begin{bmatrix}1 & 0\\-j & 0\\0 & 1\\0 & -1\end{bmatrix}$$

corresponding to a fourth index, $$\frac{1}{2}\begin{bmatrix}1 & 0\\-1 & 0\\0 & 1\\0 & -j\end{bmatrix}$$

corresponding to a fifth index, $$\frac{1}{2}\begin{bmatrix} 1 & 0 \\ -1 & 0 \\ 0 & 1 \\ 0 & j \end{bmatrix}$$

corresponding to a sixth index, $$\frac{1}{2}\begin{bmatrix} 1 & 0 \\ j & 0 \\ 0 & 1 \\ 0 & 1 \end{bmatrix}$$

corresponding to a seventh index, $$\frac{1}{2}\begin{bmatrix} 1 & 0 \\ j & 0 \\ 0 & 1 \\ 0 & -1 \end{bmatrix}$$

corresponding to an eighth index, $$\frac{1}{2}\begin{bmatrix} 1 & 0 \\ 0 & 1 \\ 1 & 0 \\ 0 & 1 \end{bmatrix}$$

corresponding to a ninth index, $$\frac{1}{2}\begin{bmatrix} 1 & 0 \\ 0 & 1 \\ 1 & 0 \\ 0 & -1 \end{bmatrix}$$

corresponding to a tenth index, $$\frac{1}{2}\begin{bmatrix} 1 & 0 \\ 0 & 1 \\ -1 & 0 \\ 0 & 1 \end{bmatrix}$$

corresponding to an eleventh index, $$\frac{1}{2}\begin{bmatrix} 1 & 0 \\ 0 & 1 \\ -1 & 0 \\ 0 & -1 \end{bmatrix}$$

corresponding to a twelfth index, $$\frac{1}{2}\begin{bmatrix} 0 & 1 \\ 1 & 0 \\ 0 & 1 \\ 1 & 0 \end{bmatrix}$$

corresponding to a thirteenth index, $$\frac{1}{2}\begin{bmatrix} 0 & 1 \\ 1 & 0 \\ 0 & -1 \\ 1 & 0 \end{bmatrix}$$

corresponding to a fourteenth index, and $$\frac{1}{2}\begin{bmatrix} 0 & 1 \\ 1 & 0 \\ 0 & 1 \\ -1 & 0 \end{bmatrix}$$

corresponding to a fifteenth index, $$\frac{1}{2}\begin{bmatrix} 0 & 1 \\ 1 & 0 \\ 0 & -1 \\ -1 & 0 \end{bmatrix}$$

corresponding to a sixteenth index.

In some embodiments, the codebook corresponding to partial-coherent transmission and a rank of three includes entries selected from the group including $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index, $$\frac{1}{2}\begin{bmatrix} 1 & 0 & 0 \\ 0 & 1 & 0 \\ 1 & 0 & 0 \\ 0 & 0 & 1 \end{bmatrix}$$

corresponding to a fifth index, $$\frac{1}{2}\begin{bmatrix} 1 & 0 & 0 \\ 0 & 1 & 0 \\ -1 & 0 & 0 \\ 0 & 0 & 1 \end{bmatrix}$$

corresponding to a sixth index, $$\frac{1}{2}\begin{bmatrix} 0 & 1 & 0 \\ 1 & 0 & 0 \\ 0 & 0 & 1 \\ 1 & 0 & 0 \end{bmatrix}$$

corresponding to a seventh index, and $$\frac{1}{2}\begin{bmatrix} 0 & 1 & 0 \\ 1 & 0 & 0 \\ 0 & 0 & 1 \\ -1 & 0 & 0 \end{bmatrix}$$

corresponding to an eighth index.

In certain embodiments, the codebook corresponding to partial-coherent transmission and a rank of four includes $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

In some embodiments, the codebook corresponding to partial-coherent transmission and a rank of one includes entries selected from the group including $$\frac{1}{2}\begin{bmatrix} 1 \\ 1 \\ 0 \\ 0 \end{bmatrix}$$

corresponding to a first index, $$\frac{1}{2}\begin{bmatrix} 1 \\ -1 \\ 0 \\ 0 \end{bmatrix}$$

corresponding to a second index, $$\frac{1}{2}\begin{bmatrix} 1 \\ j \\ 0 \\ 0 \end{bmatrix}$$

corresponding to a third index, $$\frac{1}{2}\begin{bmatrix} 1 \\ -j \\ 0 \\ 0 \end{bmatrix}$$

corresponding to a fourth index, $$\frac{1}{2}\begin{bmatrix} 0 \\ 0 \\ 1 \\ 1 \end{bmatrix}$$

corresponding to a fifth index, $$\frac{1}{2}\begin{bmatrix} 0 \\ 0 \\ 1 \\ -1 \end{bmatrix}$$

corresponding to a sixth index, $$\frac{1}{2}\begin{bmatrix} 0 \\ 0 \\ 1 \\ j \end{bmatrix}$$

corresponding to a seventh index, $$\frac{1}{2}\begin{bmatrix} 0 \\ 0 \\ 1 \\ -j \end{bmatrix}$$

corresponding to an eighth index, $$\frac{1}{2}\begin{bmatrix}1\\0\\0\\0\end{bmatrix}$$

corresponding to a ninth index, $$\frac{1}{2}\begin{bmatrix}0\\1\\0\\0\end{bmatrix}$$

corresponding to a tenth index, $$\frac{1}{2}\begin{bmatrix}0\\0\\1\\0\end{bmatrix}$$

corresponding to an eleventh index, and $$\frac{1}{2}\begin{bmatrix}0\\0\\0\\1\end{bmatrix}$$

corresponding to a twelfth index.

In various embodiments, the codebook corresponding to partial-coherent transmission and a rank of two includes entries selected from the group including $$\frac{1}{2}\begin{bmatrix}1&0\\1&0\\0&1\\0&-j\end{bmatrix}$$

corresponding to a first index, $$\frac{1}{2}\begin{bmatrix}1&0\\1&0\\0&1\\0&j\end{bmatrix}$$

corresponding to a second index, $$\frac{1}{2}\begin{bmatrix}1&0\\-j&0\\0&1\\0&1\end{bmatrix}$$

corresponding to a third index, $$\frac{1}{2}\begin{bmatrix}1&0\\-j&0\\0&1\\0&-1\end{bmatrix}$$

corresponding to a fourth index, $$\frac{1}{2}\begin{bmatrix}1&0\\-1&0\\0&1\\0&-j\end{bmatrix}$$

corresponding to a fifth index, $$\frac{1}{2}\begin{bmatrix}1&0\\-1&0\\0&1\\0&j\end{bmatrix}$$

corresponding to a sixth index, $$\frac{1}{2}\begin{bmatrix}1&0\\j&0\\0&1\\0&1\end{bmatrix}$$

corresponding to a seventh index, and $$\frac{1}{2}\begin{bmatrix}1&0\\j&0\\0&1\\0&-1\end{bmatrix}$$

corresponding to an eighth index.

In certain embodiments, the codebook corresponding to partial-coherent transmission and a rank of three includes entries selected from the group including $$\frac{1}{2}\begin{bmatrix}1&0&0\\1&0&0\\0&1&0\\0&0&1\end{bmatrix}$$

corresponding to a first index, $$\frac{1}{2}\begin{bmatrix}1&0&0\\-1&0&0\\0&1&0\\0&0&1\end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, and $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index.

In some embodiments, the codebook corresponding to non-coherent transmission and a rank of one includes entries selected from the group including $$\frac{1}{2}\begin{bmatrix} 1 \\ 0 \\ 0 \\ 0 \end{bmatrix}$$

corresponding to a first index, $$\frac{1}{2}\begin{bmatrix} 0 \\ 1 \\ 0 \\ 0 \end{bmatrix}$$

corresponding to a second index, $$\frac{1}{2}\begin{bmatrix} 0 \\ 0 \\ 1 \\ 0 \end{bmatrix}$$

corresponding to a third index, and $$\frac{1}{2}\begin{bmatrix} 0 \\ 0 \\ 0 \\ 1 \end{bmatrix}$$

corresponding to a fourth index.

In certain embodiments, the codebook corresponding to non-coherent transmission and a rank of two includes entries selected from the group including $$\frac{1}{2}\begin{bmatrix} 1 & 0 \\ 0 & 1 \\ 0 & 0 \\ 0 & 0 \end{bmatrix}$$

corresponding to a first index, $$\frac{1}{2}\begin{bmatrix} 1 & 0 \\ 0 & 0 \\ 0 & 1 \\ 0 & 0 \end{bmatrix}$$

corresponding to a second index, $$\frac{1}{2}\begin{bmatrix} 1 & 0 \\ 0 & 0 \\ 0 & 0 \\ 0 & 1 \end{bmatrix}$$

corresponding to a third index, $$\frac{1}{2}\begin{bmatrix} 0 & 0 \\ 1 & 0 \\ 0 & 1 \\ 0 & 0 \end{bmatrix}$$

corresponding to a fourth index, $$\frac{1}{2}\begin{bmatrix} 0 & 0 \\ 1 & 0 \\ 0 & 0 \\ 0 & 1 \end{bmatrix}$$

corresponding to a fifth index, and $$\frac{1}{2}\begin{bmatrix} 0 & 0 \\ 0 & 0 \\ 1 & 0 \\ 0 & 1 \end{bmatrix}$$

corresponding to a sixth index.

In various embodiments, the codebook corresponding to non-coherent transmission and a rank of three includes entries selected from the group including $$\frac{1}{2}\begin{bmatrix} 1 & 0 & 0 \\ 0 & 1 & 0 \\ 0 & 0 & 1 \\ 0 & 0 & 0 \end{bmatrix}$$

corresponding to a first index, $$\frac{1}{2}\begin{bmatrix} 1 & 0 & 0 \\ 0 & 1 & 0 \\ 0 & 0 & 0 \\ 0 & 0 & 1 \end{bmatrix}$$

corresponding to a second index, $$\frac{1}{2}\begin{bmatrix} 1 & 0 & 0 \\ 0 & 0 & 0 \\ 0 & 1 & 0 \\ 0 & 0 & 1 \end{bmatrix}$$

corresponding to a third index, and $$\frac{1}{2}\begin{bmatrix} 0 & 0 & 0 \\ 1 & 0 & 0 \\ 0 & 1 & 0 \\ 0 & 0 & 1 \end{bmatrix}$$

corresponding to a fourth index.

In some embodiments, the codebook corresponding to non-coherent transmission and a rank of four includes $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

In various embodiments, the method 500 includes transmitting a subset indication to the base unit, wherein the transmit precoding matrix indication corresponding to a rank of one includes four bits, the transmit precoding matrix indication corresponding to a rank of two includes three bits, and the transmit precoding matrix indication corresponding to a rank of three includes two bits.

In certain embodiments, the subset indication indicates remote unit ports that are coherent with each other. In one embodiment, the subset indication indicates portions of the codebook that are used for a corresponding subset. In some embodiments, remote unit ports that are coherent with each other is predetermined, and the transmit precoding matrix indication corresponding to a rank of one includes four bits, the transmit precoding matrix indication corresponding to a rank of two includes three bits, and the transmit precoding matrix indication corresponding to a rank of three includes two bits.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving information indicating a transmission capability of a remote unit;
   determining a transmit precoding matrix indication based on a rank and a codebook corresponding to the transmission capability and the rank, wherein the transmit precoding matrix indication corresponding to a rank of one comprises a maximum of five bits, the transmit precoding matrix indication corresponding to a rank of two comprises a maximum of four bits, and the transmit precoding matrix indication corresponding to a rank of three comprises a maximum of three bits; and
   transmitting the transmit precoding matrix indication to the remote unit.

2. The method of claim 1, wherein the transmission capability is selected from the group comprising full-coherent transmission, partial-coherent transmission, and non-coherent transmission.

3. The method of claim 1, wherein the rank is selected from the group comprising a rank of one, a rank of two, a rank of three, and a rank of four.

4. The method of claim 1, wherein the codebook corresponding to partial-coherent transmission and a rank of one comprises entries selected from the group comprising $$\frac{1}{2}\begin{bmatrix} 1 \\ 1 \\ 0 \\ 0 \end{bmatrix}$$

corresponding to a first index, $$\frac{1}{2}\begin{bmatrix} 1 \\ -1 \\ 0 \\ 0 \end{bmatrix}$$

corresponding to a second index, $$\frac{1}{2}\begin{bmatrix} 1 \\ j \\ 0 \\ 0 \end{bmatrix}$$

corresponding to a third index, $$\frac{1}{2}\begin{bmatrix} 1 \\ -j \\ 0 \\ 0 \end{bmatrix}$$

corresponding to a fourth index, $$\frac{1}{2}\begin{bmatrix} 0 \\ 0 \\ 1 \\ 1 \end{bmatrix}$$

corresponding to a fifth index, $$\frac{1}{2}\begin{bmatrix} 0 \\ 0 \\ 1 \\ -1 \end{bmatrix}$$

corresponding to a sixth index, $$\frac{1}{2}\begin{bmatrix}0\\0\\1\\j\end{bmatrix}$$

corresponding to a seventh index, $$\frac{1}{2}\begin{bmatrix}0\\0\\1\\-j\end{bmatrix}$$

corresponding to an eighth index, $$\frac{1}{2}\begin{bmatrix}1\\0\\1\\0\end{bmatrix}$$

corresponding to a ninth index, $$\frac{1}{2}\begin{bmatrix}1\\0\\-1\\0\end{bmatrix}$$

corresponding to a tenth index, $$\frac{1}{2}\begin{bmatrix}1\\0\\j\\0\end{bmatrix}$$

corresponding to an eleventh index $$\frac{1}{2}\begin{bmatrix}1\\0\\-j\\0\end{bmatrix}$$

corresponding to a twelfth index, $$\frac{1}{2}\begin{bmatrix}0\\1\\0\\1\end{bmatrix}$$

corresponding to a thirteenth index, $$\frac{1}{2}\begin{bmatrix}0\\1\\0\\-1\end{bmatrix}$$

corresponding to a fourteenth index, $$\frac{1}{2}\begin{bmatrix}0\\1\\0\\j\end{bmatrix}$$

corresponding to a fifteenth index, $$\frac{1}{2}\begin{bmatrix}0\\1\\0\\-j\end{bmatrix}$$

corresponding to a sixteenth index, $$\frac{1}{2}\begin{bmatrix}1\\0\\0\\0\end{bmatrix}$$

corresponding to a seventeenth index, $$\frac{1}{2}\begin{bmatrix}0\\1\\0\\0\end{bmatrix}$$

corresponding to an eighteenth index, and $$\frac{1}{2}\begin{bmatrix}0\\0\\1\\0\end{bmatrix}$$

corresponding to a nineteenth index, $$\frac{1}{2}\begin{bmatrix}0\\0\\0\\1\end{bmatrix}$$

corresponding to a twentieth index.

5. The method of claim 1, wherein the codebook corresponding to partial-coherent transmission and a rank of two comprises entries selected from the group comprising $$\frac{1}{2}\begin{bmatrix} 1 & 0 \\ 1 & 0 \\ 0 & 1 \\ 0 & -j \end{bmatrix}$$

corresponding to a first index, $$\frac{1}{2}\begin{bmatrix} 1 & 0 \\ 1 & 0 \\ 0 & 1 \\ 0 & j \end{bmatrix}$$

corresponding to a second index, $$\frac{1}{2}\begin{bmatrix} 1 & 0 \\ -j & 0 \\ 0 & 1 \\ 0 & 1 \end{bmatrix}$$

corresponding to a third index, $$\frac{1}{2}\begin{bmatrix} 1 & 0 \\ -j & 0 \\ 0 & 1 \\ 0 & -1 \end{bmatrix}$$

corresponding to a fourth index, $$\frac{1}{2}\begin{bmatrix} 1 & 0 \\ -1 & 0 \\ 0 & 1 \\ 0 & -j \end{bmatrix}$$

corresponding to a fifth index, $$\frac{1}{2}\begin{bmatrix} 1 & 0 \\ -1 & 0 \\ 0 & 1 \\ 0 & j \end{bmatrix}$$

corresponding to a sixth index, $$\frac{1}{2}\begin{bmatrix} 1 & 0 \\ j & 0 \\ 0 & 1 \\ 0 & 1 \end{bmatrix}$$

corresponding to a seventh index, $$\frac{1}{2}\begin{bmatrix} 1 & 0 \\ j & 0 \\ 0 & 1 \\ 0 & -1 \end{bmatrix}$$

corresponding to an eighth index, $$\frac{1}{2}\begin{bmatrix} 1 & 0 \\ 0 & 1 \\ 1 & 0 \\ 0 & 1 \end{bmatrix}$$

corresponding to a ninth index, $$\frac{1}{2}\begin{bmatrix} 1 & 0 \\ 0 & 1 \\ 1 & 0 \\ 0 & -1 \end{bmatrix}$$

corresponding to a tenth index, $$\frac{1}{2}\begin{bmatrix} 1 & 0 \\ 0 & 1 \\ -1 & 0 \\ 0 & 1 \end{bmatrix}$$

corresponding to an eleventh index, $$\frac{1}{2}\begin{bmatrix} 1 & 0 \\ 0 & 1 \\ -1 & 0 \\ 0 & -1 \end{bmatrix}$$

corresponding to a twelfth index, $$\frac{1}{2}\begin{bmatrix} 0 & 1 \\ 1 & 0 \\ 0 & 1 \\ 1 & 0 \end{bmatrix}$$

corresponding to a thirteenth index, $$\frac{1}{2}\begin{bmatrix} 0 & 1 \\ 1 & 0 \\ 0 & -1 \\ 1 & 0 \end{bmatrix}$$

corresponding to a fourteenth index, and $$\frac{1}{2}\begin{bmatrix} 0 & 1 \\ 1 & 0 \\ 0 & 1 \\ -1 & 0 \end{bmatrix}$$

corresponding to a fifteenth index, $$\frac{1}{2}\begin{bmatrix} 0 & 1 \\ 1 & 0 \\ 0 & -1 \\ -1 & 0 \end{bmatrix}$$

corresponding to a sixteenth index.

6. The method of claim 1, wherein the codebook corresponding to partial-coherent transmission and a rank of three comprises entries selected from the group comprising $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index, $$\frac{1}{2}\begin{bmatrix} 1 & 0 & 0 \\ 0 & 1 & 0 \\ 1 & 0 & 0 \\ 0 & 0 & 1 \end{bmatrix}$$

corresponding to a fifth index, $$\frac{1}{2}\begin{bmatrix} 1 & 0 & 0 \\ 0 & 1 & 0 \\ -1 & 0 & 0 \\ 0 & 0 & 1 \end{bmatrix}$$

corresponding to a sixth index, $$\frac{1}{2}\begin{bmatrix} 0 & 1 & 0 \\ 1 & 0 & 0 \\ 0 & 0 & 1 \\ 1 & 0 & 0 \end{bmatrix}$$

corresponding to a seventh index, and $$\frac{1}{2}\begin{bmatrix} 0 & 1 & 0 \\ 1 & 0 & 0 \\ 0 & 0 & 1 \\ -1 & 0 & 0 \end{bmatrix}$$

corresponding to an eighth index.

7. The method of claim 1, wherein the codebook corresponding to partial-coherent transmission and a rank of one comprises entries selected from the group comprising $$\frac{1}{2}\begin{bmatrix} 1 \\ 1 \\ 0 \\ 0 \end{bmatrix}$$

corresponding to a first index, $$\frac{1}{2}\begin{bmatrix} 1 \\ -1 \\ 0 \\ 0 \end{bmatrix}$$

corresponding to a second index, $$\frac{1}{2}\begin{bmatrix} 1 \\ j \\ 0 \\ 0 \end{bmatrix}$$

corresponding to a third index, $$\frac{1}{2}\begin{bmatrix} 1 \\ -j \\ 0 \\ 0 \end{bmatrix}$$

corresponding to a fourth index, $$\frac{1}{2}\begin{bmatrix} 0 \\ 0 \\ 1 \\ 1 \end{bmatrix}$$

corresponding to a fifth index, $$\frac{1}{2}\begin{bmatrix} 0 \\ 0 \\ 1 \\ -1 \end{bmatrix}$$

corresponding to a sixth index, $$\frac{1}{2}\begin{bmatrix} 0 \\ 0 \\ 1 \\ j \end{bmatrix}$$

corresponding to a seventh index, $$\frac{1}{2}\begin{bmatrix} 0 \\ 0 \\ 1 \\ -j \end{bmatrix}$$

corresponding to an eighth index, $$\frac{1}{2}\begin{bmatrix} 1 \\ 0 \\ 0 \\ 0 \end{bmatrix}$$

corresponding to a ninth index, $$\frac{1}{2}\begin{bmatrix} 0 \\ 1 \\ 0 \\ 0 \end{bmatrix}$$

corresponding to a tenth index, $$\frac{1}{2}\begin{bmatrix} 0 \\ 0 \\ 1 \\ 0 \end{bmatrix}$$

corresponding to an eleventh index, and $$\frac{1}{2}\begin{bmatrix} 0 \\ 0 \\ 0 \\ 1 \end{bmatrix}$$

corresponding to a twelfth index.

8. The method of claim 1, wherein the codebook corresponding to partial-coherent transmission and a rank of two comprises entries selected from the group comprising $$\frac{1}{2}\begin{bmatrix} 1 & 0 \\ 1 & 0 \\ 0 & 1 \\ 0 & -j \end{bmatrix}$$

corresponding to a first index, $$\frac{1}{2}\begin{bmatrix} 1 & 0 \\ 1 & 0 \\ 0 & 1 \\ 0 & j \end{bmatrix}$$

corresponding to a second index, $$\frac{1}{2}\begin{bmatrix} 1 & 0 \\ -j & 0 \\ 0 & 1 \\ 0 & 1 \end{bmatrix}$$

corresponding to a third index, $$\frac{1}{2}\begin{bmatrix} 1 & 0 \\ -j & 0 \\ 0 & 1 \\ 0 & -1 \end{bmatrix}$$

corresponding to a fourth index, $$\frac{1}{2}\begin{bmatrix} 1 & 0 \\ -1 & 0 \\ 0 & 1 \\ 0 & -j \end{bmatrix}$$

corresponding to a fifth index, $$\frac{1}{2}\begin{bmatrix} 1 & 0 \\ -1 & 0 \\ 0 & 1 \\ 0 & j \end{bmatrix}$$

corresponding to a sixth index, $$\frac{1}{2}\begin{bmatrix} 1 & 0 \\ j & 0 \\ 0 & 1 \\ 0 & 1 \end{bmatrix}$$

corresponding to a seventh index, $$\frac{1}{2}\begin{bmatrix} 1 & 0 \\ j & 0 \\ 0 & 1 \\ 0 & -1 \end{bmatrix}$$

and corresponding to an eighth index.

9. The method of claim 1, wherein the codebook corresponding to partial-coherent transmission and a rank of three comprises entries selected from the group comprising $$\frac{1}{2}\begin{bmatrix} 1 & 0 & 0 \\ 1 & 0 & 0 \\ 0 & 1 & 0 \\ 0 & 0 & 1 \end{bmatrix}$$

corresponding to a first index, $$\frac{1}{2}\begin{bmatrix} 1 & 0 & 0 \\ -1 & 0 & 0 \\ 0 & 1 & 0 \\ 0 & 0 & 1 \end{bmatrix}$$

corresponding to a second index, $$\frac{1}{2}\begin{bmatrix} 0 & 1 & 0 \\ 0 & 0 & 1 \\ 1 & 0 & 0 \\ 1 & 0 & 0 \end{bmatrix}$$

corresponding to a third index, and $$\frac{1}{2}\begin{bmatrix} 0 & 1 & 0 \\ 0 & 0 & 1 \\ 1 & 0 & 0 \\ -1 & 0 & 0 \end{bmatrix}$$

corresponding to a fourth index.

10. An apparatus comprising:
a receiver that receives information indicating a transmission capability of a remote unit;
a processor that determines a transmit precoding matrix indication based on a rank and a codebook corresponding to the transmission capability and the rank, wherein the transmit precoding matrix indication corresponding to a rank of one comprises a maximum of five bits, the transmit precoding matrix indication corresponding to a rank of two comprises a maximum of four bits, and the transmit precoding matrix indication corresponding to a rank of three comprises a maximum of three bits; and
a transmitter that transmits the transmit precoding matrix indication to the remote unit.

11. A method comprising:
transmitting information indicating a transmission capability of a remote unit; and
receiving a transmit precoding matrix indication from a base unit, wherein the transmit precoding matrix indication is based on a rank and a codebook corresponding to the transmission capability and the rank, the transmit precoding matrix indication corresponding to a rank of one comprises a maximum of five bits, the transmit precoding matrix indication corresponding to a rank of two comprises a maximum of four bits, and the transmit precoding matrix indication corresponding to a rank of three comprises a maximum of three bits.

12. The method of claim 11, wherein the codebook corresponding to non-coherent transmission and a rank of one comprises entries selected from the group comprising $$\frac{1}{2}\begin{bmatrix} 1 \\ 0 \\ 0 \\ 0 \end{bmatrix}$$

corresponding to a first index, $$\frac{1}{2}\begin{bmatrix} 0 \\ 1 \\ 0 \\ 0 \end{bmatrix}$$

corresponding to a second index, $$\frac{1}{2}\begin{bmatrix} 0 \\ 0 \\ 1 \\ 0 \end{bmatrix}$$

corresponding to a third index, and $$\frac{1}{2}\begin{bmatrix} 0 \\ 0 \\ 0 \\ 1 \end{bmatrix}$$

corresponding to a fourth index.

13. The method of claim 11, wherein the codebook corresponding to non-coherent transmission and a rank of two comprises entries selected from the group comprising $$\frac{1}{2}\begin{bmatrix} 1 & 0 \\ 0 & 1 \\ 0 & 0 \\ 0 & 0 \end{bmatrix}$$

corresponding to a first index, $$\frac{1}{2}\begin{bmatrix} 1 & 0 \\ 0 & 0 \\ 0 & 1 \\ 0 & 0 \end{bmatrix}$$

corresponding to a second index, $$\frac{1}{2}\begin{bmatrix} 1 & 0 \\ 0 & 0 \\ 0 & 0 \\ 0 & 1 \end{bmatrix}$$

corresponding to a third index, $$\frac{1}{2}\begin{bmatrix} 0 & 0 \\ 1 & 0 \\ 0 & 1 \\ 0 & 0 \end{bmatrix}$$

corresponding to a fourth index, $$\frac{1}{2}\begin{bmatrix} 0 & 0 \\ 1 & 0 \\ 0 & 0 \\ 0 & 1 \end{bmatrix}$$

corresponding to a fifth index, and $$\frac{1}{2}\begin{bmatrix} 0 & 0 \\ 0 & 0 \\ 1 & 0 \\ 0 & 1 \end{bmatrix}$$

corresponding to a sixth index.

14. The method of claim 11, wherein the codebook corresponding to non-coherent transmission and a rank of three comprises entries selected from the group comprising $$\frac{1}{2}\begin{bmatrix} 1 & 0 & 0 \\ 0 & 1 & 0 \\ 0 & 0 & 1 \\ 0 & 0 & 0 \end{bmatrix}$$

corresponding to a first index, $$\frac{1}{2}\begin{bmatrix} 1 & 0 & 0 \\ 0 & 1 & 0 \\ 0 & 0 & 0 \\ 0 & 0 & 1 \end{bmatrix}$$

corresponding to a second index, $$\frac{1}{2}\begin{bmatrix} 1 & 0 & 0 \\ 0 & 0 & 0 \\ 0 & 1 & 0 \\ 0 & 0 & 1 \end{bmatrix}$$

corresponding to a third index, and $$\frac{1}{2}\begin{bmatrix} 0 & 0 & 0 \\ 1 & 0 & 0 \\ 0 & 1 & 0 \\ 0 & 0 & 1 \end{bmatrix}$$

corresponding to a fourth index.

15. The method of claim 11, wherein the codebook corresponding to a rank of four comprises $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

corresponding to an index.

16. The method of claim 11, further comprising transmitting a subset indication to the base unit, wherein the transmit precoding matrix indication corresponding to a rank of one comprises four bits, the transmit precoding matrix indication corresponding to a rank of two comprises three bits, and the transmit precoding matrix indication corresponding to a rank of three comprises two bits.

17. The method of claim 16, wherein the subset indication indicates remote unit ports that are coherent with each other.

18. The method of claim 16, wherein the subset indication indicates portions of the codebook that are used for a corresponding subset.

19. The method of claim 11, wherein remote unit ports that are coherent with each other is predetermined, and the transmit precoding matrix indication corresponding to a rank of one comprises four bits, the transmit precoding matrix indication corresponding to a rank of two comprises three bits, and the transmit precoding matrix indication corresponding to a rank of three comprises two bits.

20. An apparatus comprising:
a transmitter that transmits information indicating a transmission capability of a remote unit; and
a receiver that receives a transmit precoding matrix indication from a base unit, wherein the transmit precoding matrix indication is based on a rank and a codebook corresponding to the transmission capability and the rank, the transmit precoding matrix indication corresponding to a rank of one comprises a maximum of five bits, the transmit precoding matrix indication corresponding to a rank of two comprises a maximum of four bits, and the transmit precoding matrix indication corresponding to a rank of three comprises a maximum of three bits.

* * * * *